United States Patent [19]

Uzuka

[11] 4,217,508

[45] Aug. 12, 1980

[54] DC MOTOR

[75] Inventor: Mitsuo Uzuka, Urawa, Japan

[73] Assignee: Sony Corporation, Tokyo, Japan

[21] Appl. No.: 894,487

[22] Filed: Apr. 7, 1978

[30] Foreign Application Priority Data

| Apr. 8, 1977 | [JP] | Japan | 52/40565 |
| Jun. 18, 1977 | [JP] | Japan | 52/72689 |
| Feb. 20, 1978 | [JP] | Japan | 53/18274 |

[51] Int. Cl.$^2$ .......................................... H02K 37/00
[52] U.S. Cl. ....................................... 310/46; 310/67;
310/156; 310/208
[58] Field of Search ................... 310/67, 46, 156, 191,
310/DIG. 3, 164, DIG. 6, 68 R, 75 R, 266, 177,
49, 154, 268, 181, 184, 198, 168–170, 200–208;
318/138, 254

[56] References Cited

U.S. PATENT DOCUMENTS

| 3,484,635 | 12/1969 | MacKallor | 310/67 R |
| 3,512,021 | 5/1970 | Laurent | 310/67 |
| 3,631,272 | 12/1971 | Kirii | 310/46 |
| 3,644,765 | 2/1972 | Janson | 310/68 |
| 3,840,761 | 10/1974 | Muller | 310/49 |
| 3,873,897 | 3/1975 | Muller | 318/138 |
| 3,891,905 | 6/1975 | Muller | 318/138 |
| 3,914,629 | 10/1975 | Gardiner | 310/46 |
| 3,986,086 | 10/1976 | Muller | 318/138 |
| 4,030,005 | 6/1977 | Doemen | 318/138 |
| 4,099,104 | 7/1978 | Muller | 318/138 |

Primary Examiner—R. Skudy

Attorney, Agent, or Firm—Lewis H. Eslinger; Alvin Sinderbrand

[57] ABSTRACT

A DC motor having a rotor which rotates about an axis and a stator. The motor comprises at least two coils adapted to be energized for current to flow therethrough, each coil having a first current path portion through which current flows in a first direction and a second current path portion through which current flows in a second, opposite direction. A magnetic flux generator includes at least one pair of circumferentially disposed magnetic poles for generating flux of alternating magnetic field polarity in a rotary path about the axis, the magnetic flux linking each coil such that if a coil is energized throughout a region of magnetic flux of predetermined polarity, a rotational torque of predetermined direction is produced through a range having an electrical angle greater than 180°. A circuit alternately energizes the coils for current to flow through each energized coil for a duration substantially equal to an electrical angle of 180° when the energized coil is within the range of the torque of predetermined direction. In one embodiment, each coil is wound toroidally on a toroidal core, and the coils are separated by an electrical angle of 180°. In this embodiment, one magnetic polarity of the magnetic flux is asymmetric with respect to the other magnetic polarity thereof. In another embodiment, the first and second current path portions are disposed on substantially the same cylindrical surface concentric about the axis, and the first and second current path portions are separated from each other by an electrical angle less than 180°.

40 Claims, 64 Drawing Figures

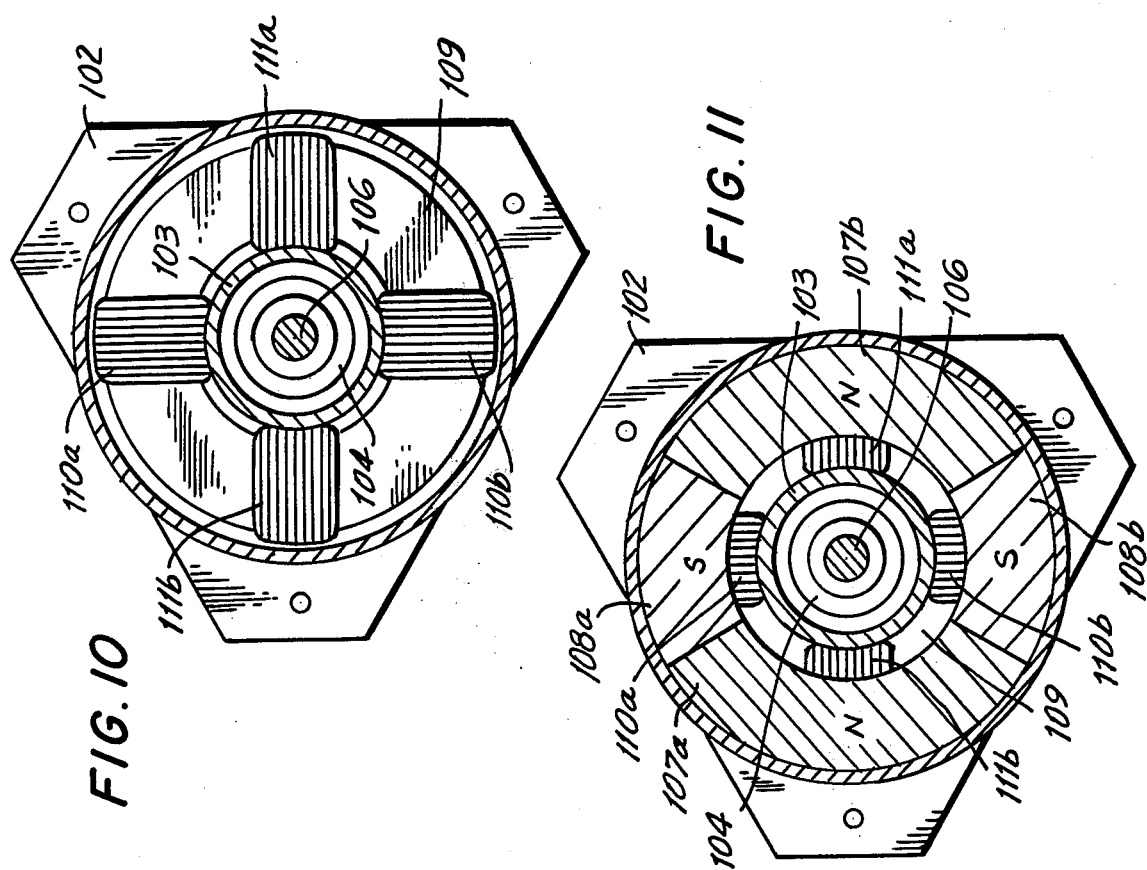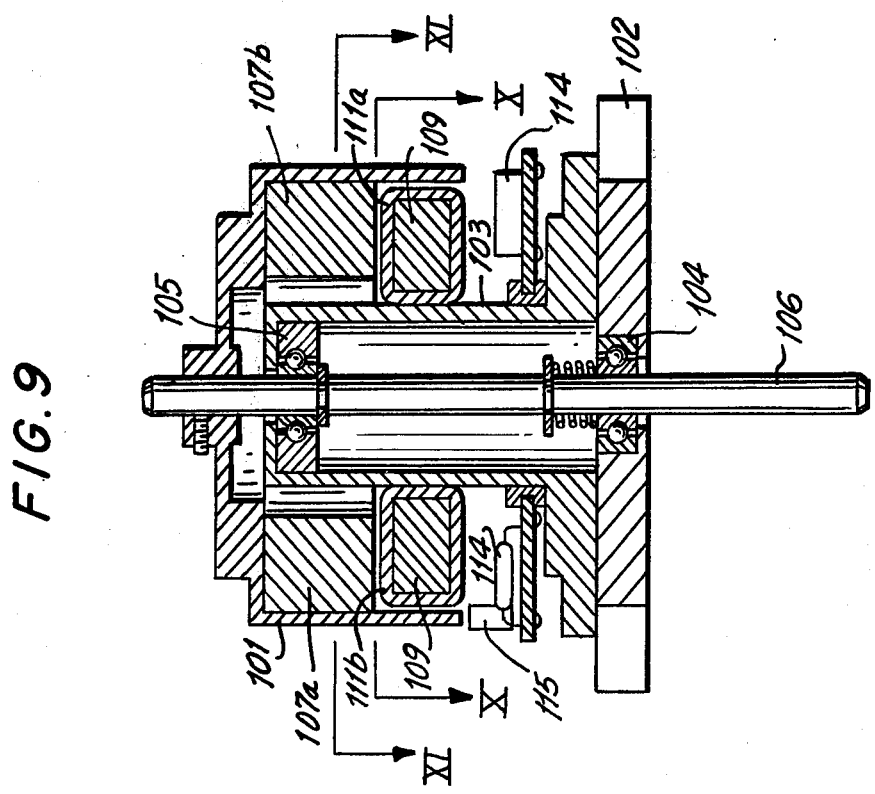

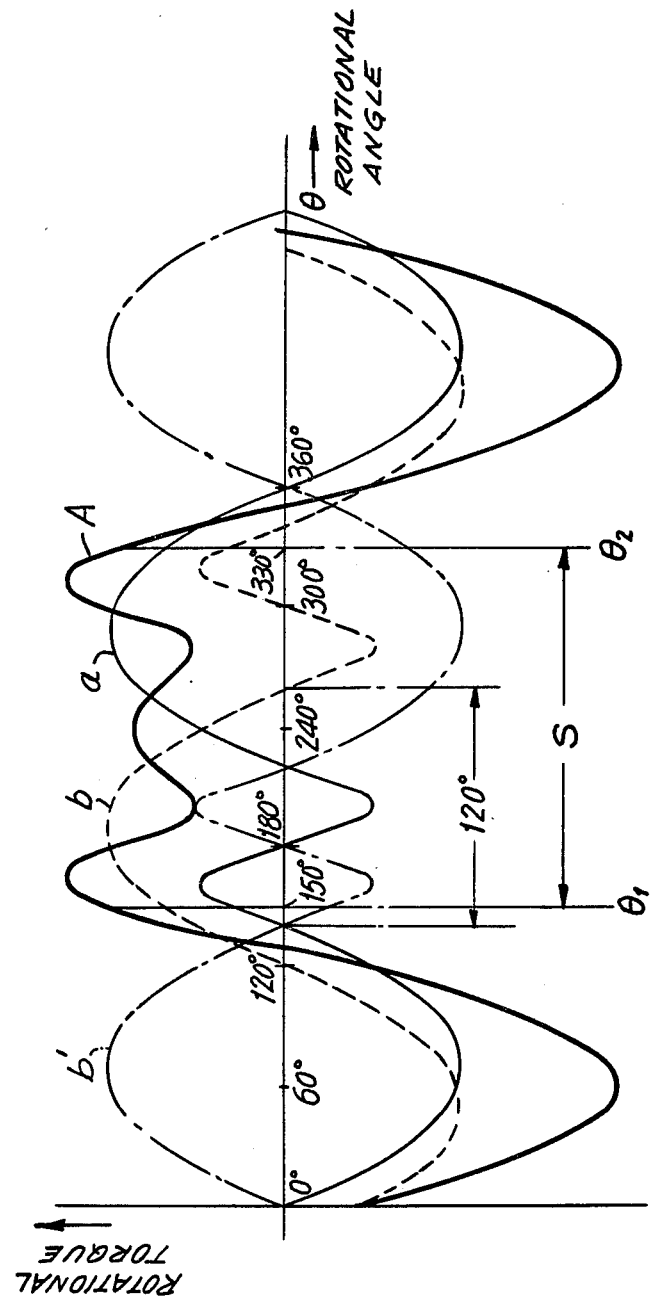

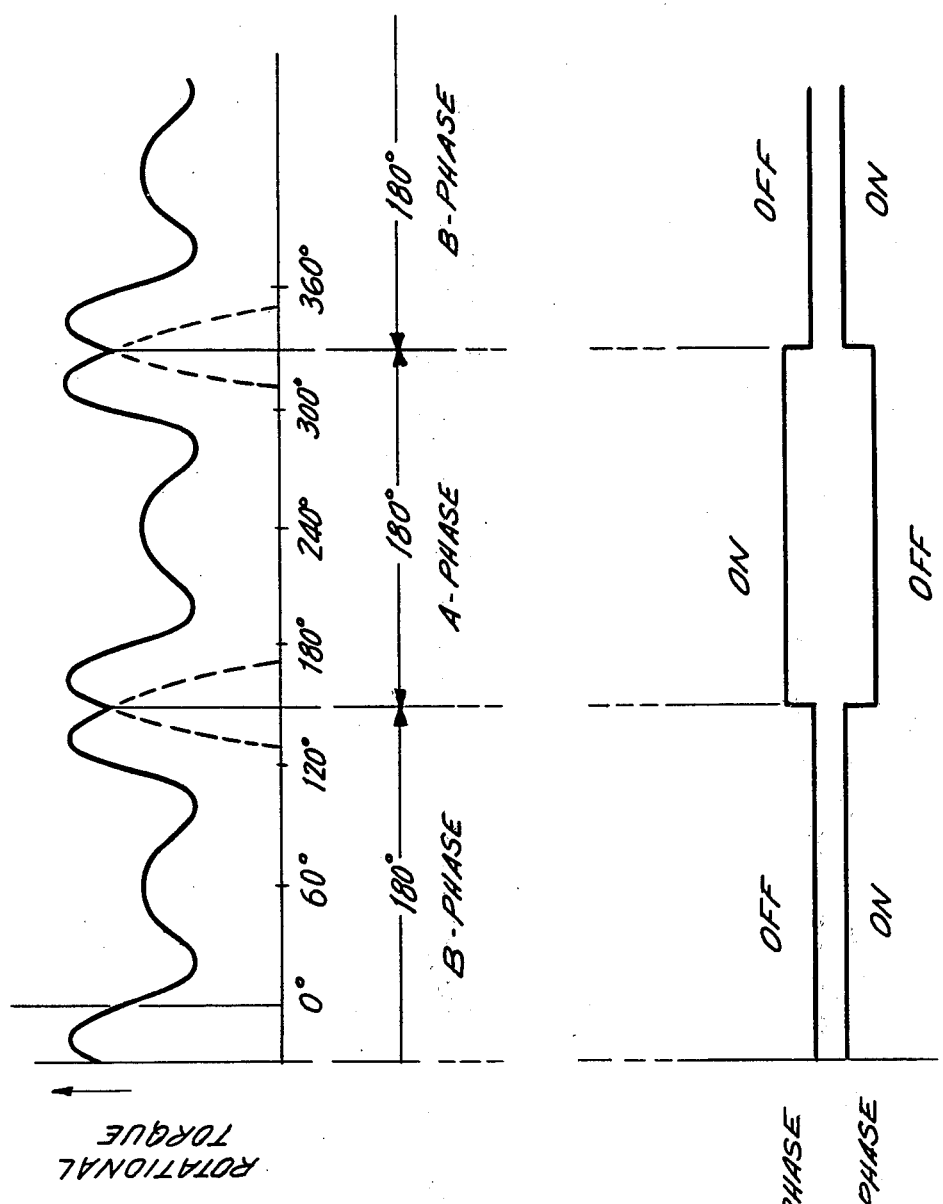

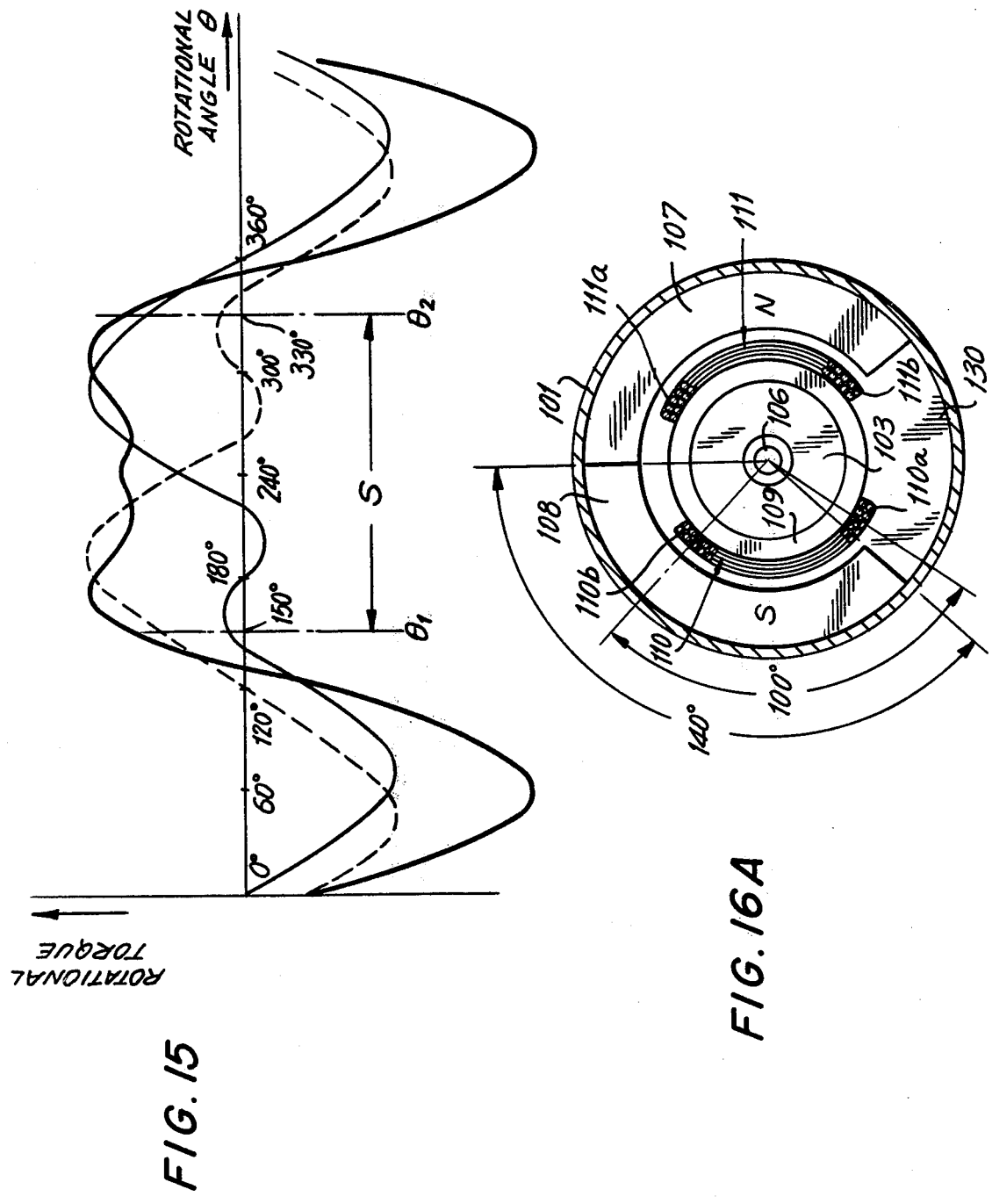

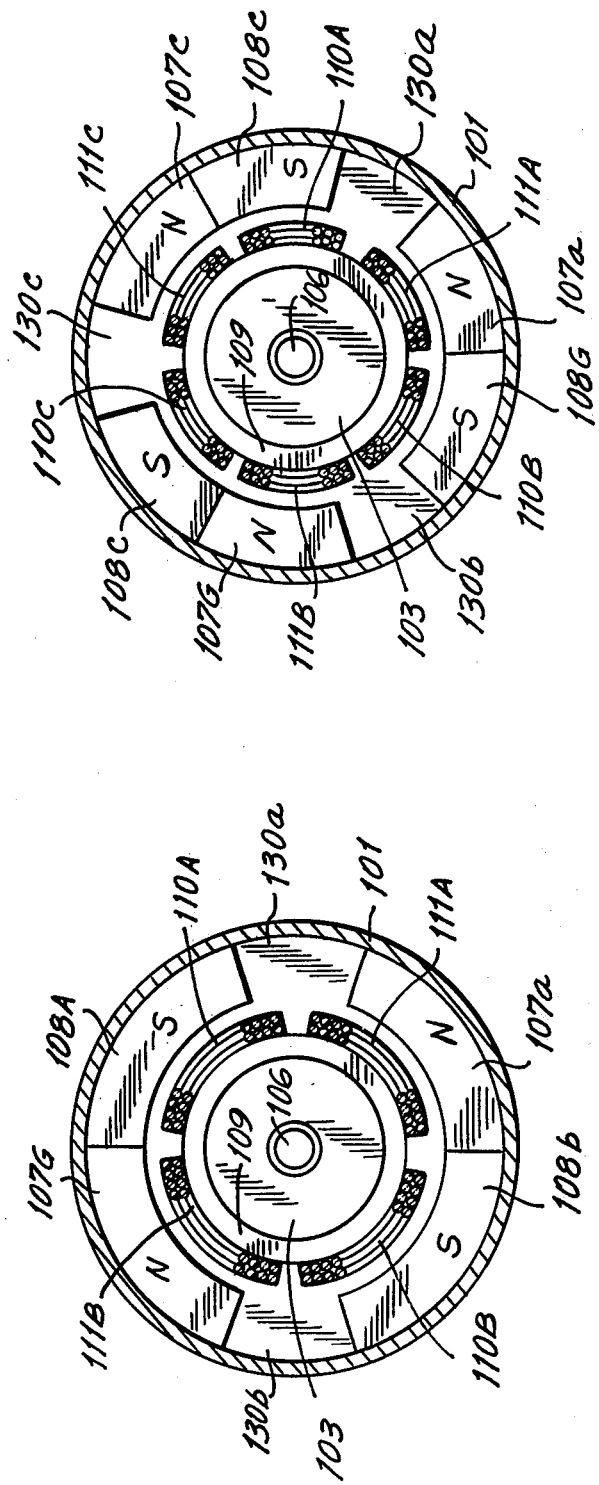

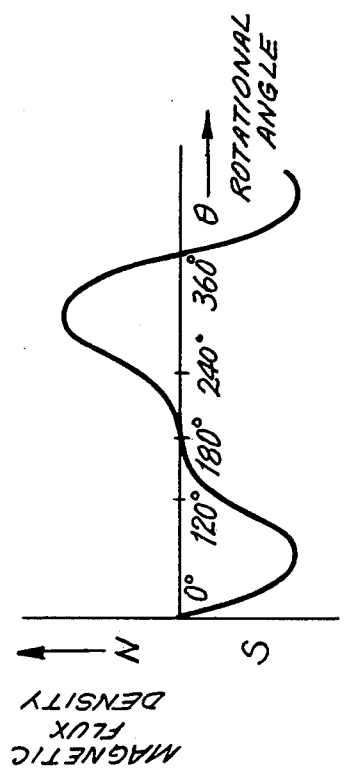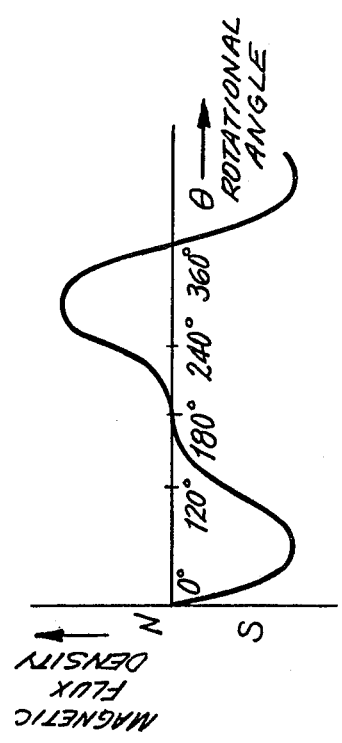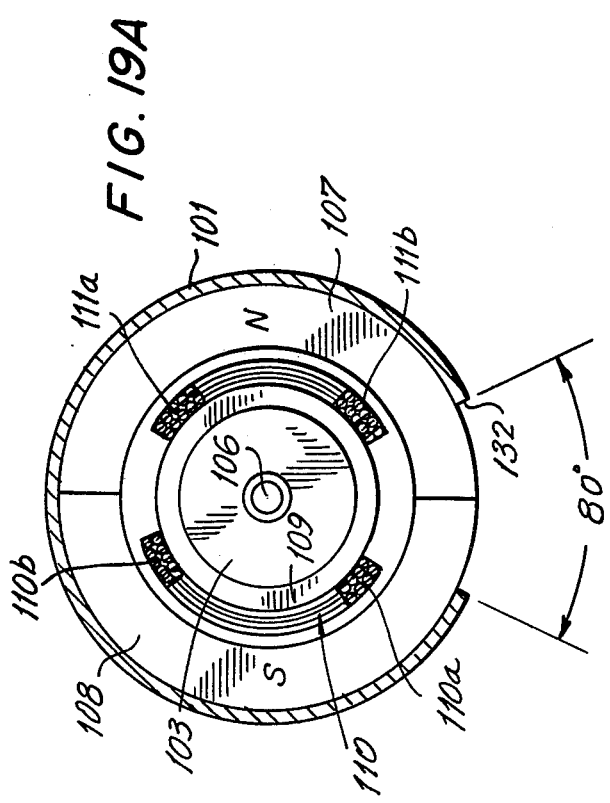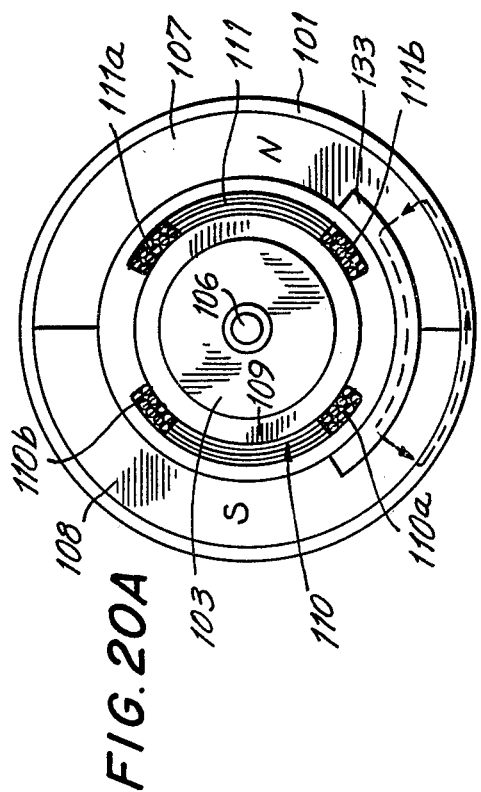

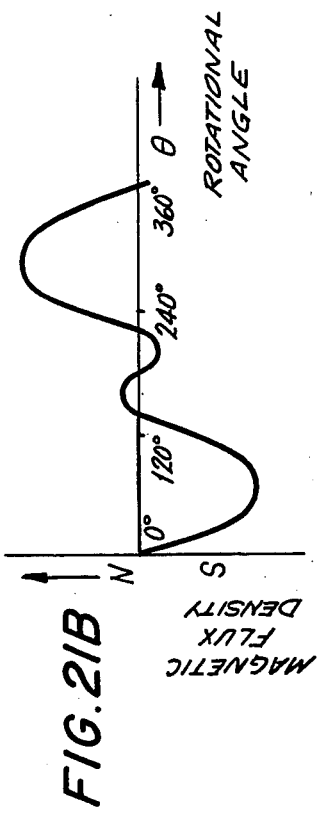
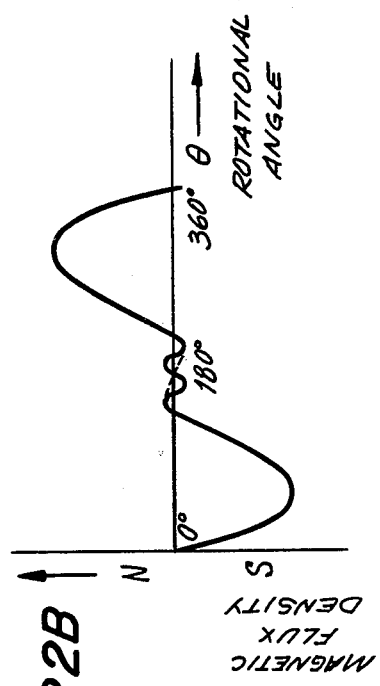
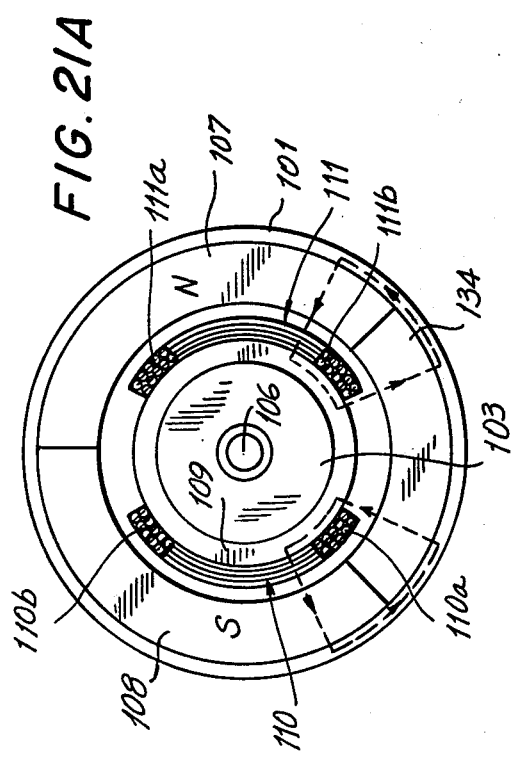
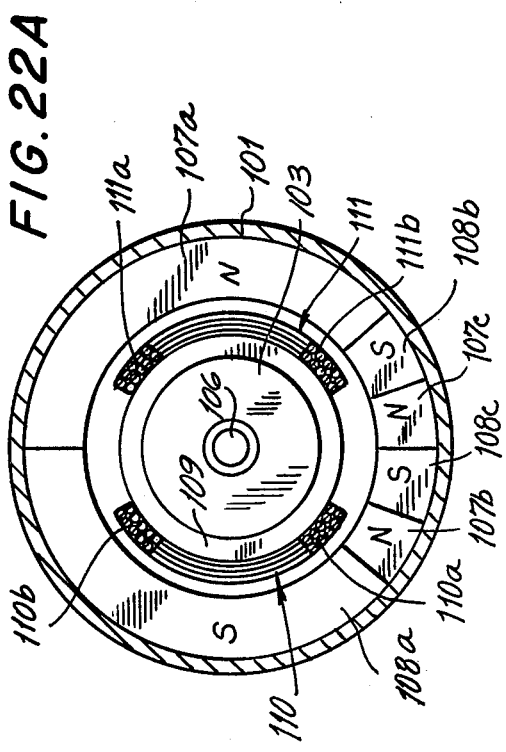

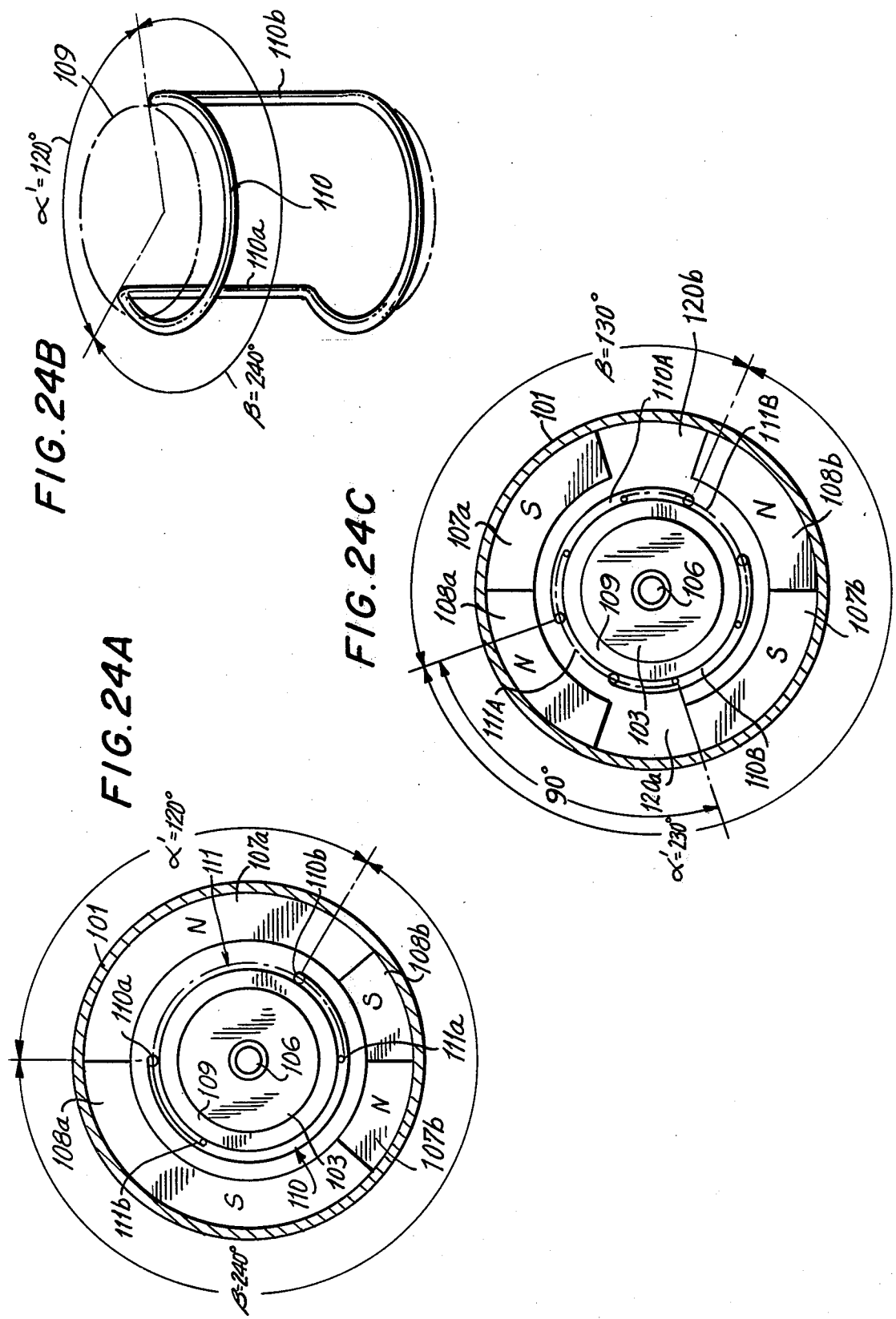

DC MOTOR

BACKGROUND OF THE INVENTION

This invention relates to a DC motor and, more particularly, to such a motor wherein, upon energization of the rotor or stator assembly thereof, results in a torque of a predetermined rotational direction which is capable of extending over an electrical angle greater than 180°, and wherein such torque exhibits relatively small ripple.

Various types of brushless DC motors are known, such as a 2-pole alternate phase motor, a 2-pole 3-phase motor, a bi-directional 2-phase motor, a 4-pole motor, and the like. In a 2-pole alternate phase motor, a single pair of magnetic poles is provided, usually formed of permanent magnet north and south pole pieces, and two alternately energized coils also are provided. Either the permanent magnet pole pieces or the coils may constitute the rotor assembly, and the rotor may be disposed either within the stator assembly or in circumscribing relation with respect thereto. Thus, each pole piece extends for an electrical angle of 180°, and each coil likewise subtends an arc of 180 electrical degrees.

In a typical 2-pole alternate phase motor, each coil includes conductor segments for carrying current in directions which are normal to the magnetic flux generated by the permanent magnet pole pieces. In accordance with Fleming's rule, also known as the left-hand rule, torque is produced in a direction perpendicular both to the direction of flux and the direction of current flow. The coils are wound on a cylindrical surface so that the conductor segments include a first current path portion for carrying current in a first direction and a second current path portion for carrying current in a second, opposite direction, these current path portions being separated by 180 electrical degrees. If one coil is energized at the moment that the first current path portion enters the region of magnetic flux having, for example, a north polarity, a rotational torque is produced so as to drive the rotor assembly in a given direction. This coil then is deenergized at the moment that the first current path portion leaves the region of magnetic flux having north polarity, and the other coil then is energized. Thus, each coil is energized only when its first current path portion first enters the region of magnetic flux of given polarity. Consequently, the resultant torque is provided with significant ripple, which may not be desirable. Furthermore, if the motor comes to rest with the first current path portion of each coil disposed in the region of magnetic flux polarity transition, it is necessary to provide auxiliary starting means for subsequently starting motor rotation.

In a typical 2-pole 3-phase motor, magnetic flux is generated by permanent magnet north and south pole pieces. However, the coil structure here is formed of three coils, as opposed to the two coils described in the aforementioned 2-pole alternate phase motor. Each coil is wound on a cylindrical surface and includes first and second current path portions which are separated from each other by 180 electrical degrees. However, the first current path portion of one coil is separated by 120° from the first current path portion of the next adjacent coil. Rotational torque of a given direction is produced when the first current path portion of a coil has advanced by a given electrical angle into the region of magnetic flux of predetermined polarity. This predetermined angle generally is about 30 electrical degrees. After one coil has been energized for a duration corresponding to 120 electrical degrees, the first current path portion of the next coil will have been advanced by an angle of 30 electrical degrees into the region of magnetic flux of predetermined polarity. At that time, the first coil is de-energized and the next coil is energized. Consequently, all three coils are energized in sequence, resulting in an overall torque whose ripple is substantially reduced from the ripple attending the aforedescribed 2-pole alternate phase motor. In addition, because of the particular dimensions of each permanent magnet pole piece, the angle subtended by each coil and the hase displacement of the respective coils, the problem of the motor coming to rest at a zero torque location, mentioned above with respect to the 2-pole alternate phase motor, is avoided. That is, auxiliary starting means is not necessary to impart a starting rotation to the motor regardless of the position at which it comes to rest.

However, one undesirable feature of the 2-pole 3-phase motor is the need for requiring three position sensing elements for detecting the relative position of each coil with respect to the permanent magnet pole pieces. These three position sensing elements are needed so as to control the selective energization of each coil. The locations of these position sensing elements must be carefully established during the assembly operation in the construction of the DC motor such that each position sensing element is properly aligned with its associated coil. This tends to increase the cost of assembly, and thus the overall cost of such a motor. Furthermore, if the position sensing elements are packaged in module form, such a packaged module can be used only with a 2-pole 3-phase motor of corresponding diameter. A different package module must be used for different diameter motors. Still further, since three coils are provided, three separate switching circuits must be used in order to selectively energize the respective coils. Thus, although the torque characteristics of the 2-pole 3-phase motor are improved over the torque characteristics of the 2-pole alternate phase motor, this improvement is achieved at a significantly increased cost of the motor.

In the 4-pole 2-phase motor, four separate energizations, or current change-over operations, must be carried out over an angle of 360 electrical degrees. This requires two separate position sensing elements and four separate switching circuits. The bi-directional 4-pole motor similarly requires two position sensing elements, but also must be provided with four separate switching circuits for each rotational direction of the motor. Hence, this bi-directional motor must be provided with eight separate switching circuits. It is appreciated that such 4-pole motors are significantly more expensive than the relatively simple 2-pole alternate phase motor.

OBJECTS OF THE INVENTION

Therefore, it is an object of the present invention to provide an improved DC motor which is of relatively low cost, and which avoids the aforenoted problems attending prior art DC motors.

Another object of this invention is to provide a DC motor wherein the rotational torque which is generated over 360 electrical degrees is not reduced to zero at any point.

A further object of this invention is to provide a brushless DC motor which needs only a single position sensing element and two separate coil-energizing circuits.

An additional object of this invention is to provide a DC motor wherein the rotational torque which is generated exhibits relatively little ripple.

Yet another object of this invention is to provide a 2-pole alternate phase motor which avoids the aforenoted problems of prior art 2-pole alternate phase motors.

Various other objects, advantages and features of the present invention will become readily apparent from the ensuing detailed description, and the novel features will be particularly pointed out in the appended claims.

SUMMARY OF THE INVENTION

In accordance with the present invention, a DC motor is provided with at least two coils adapted to be energized for current to flow therethrough, each coil having a first current path portion through which current flows in a first direction and a second current path portion through which current flows in a second, opposite direction. A flux generator includes at least one pair of magnetic poles for generating magnetic flux of alternating magnetic field polarity in a rotary path about the axis of the motor. The magnetic flux linking each coil is such that if a coil is energized throughout a region of magnetic flux of predetermined polarity, a rotational torque of predetermined direction is produced through a range having an angle greater than 180 electrical degrees. An energizing circuit is provided to alternately energize the coils for current to flow through each energized coil for a duration substantially equal to 180 electrical degrees when the energized coil is within the range of torque of predetermined direction. In one disclosed embodiment, each coil is toroidally wound on a toroidal core, and two coils are separated by 180 electrical degrees. In this embodiment, one magnetic polarity of flux is asymmetric with respect to the other magnetic polarity. In another disclosed embodiment, the first and second current path portions of each coil are disposed on substantially the same cylindrical surface which is concentric about the motor axis, and wherein the first and second current path portions are separated from each other by less than 180 electrical degrees.

BRIEF DESCRIPTION OF THE DRAWINGS

The following detailed description, given by way of example, will best be understood in conjunction with the accompanying drawings in which:

FIGS. 9–11 represent another modification of this embodiment of the DC motor;

FIGS. 14A–14E are useful in explaining the operation of this embodiment of the DC motor;

FIG. 15 is a waveform diagram useful in explaining the operation of a modification of this embodiment of the DC motor;

DETAILED DESCRIPTION OF PREFERRED EMBODIMENTS

Figure 1A:
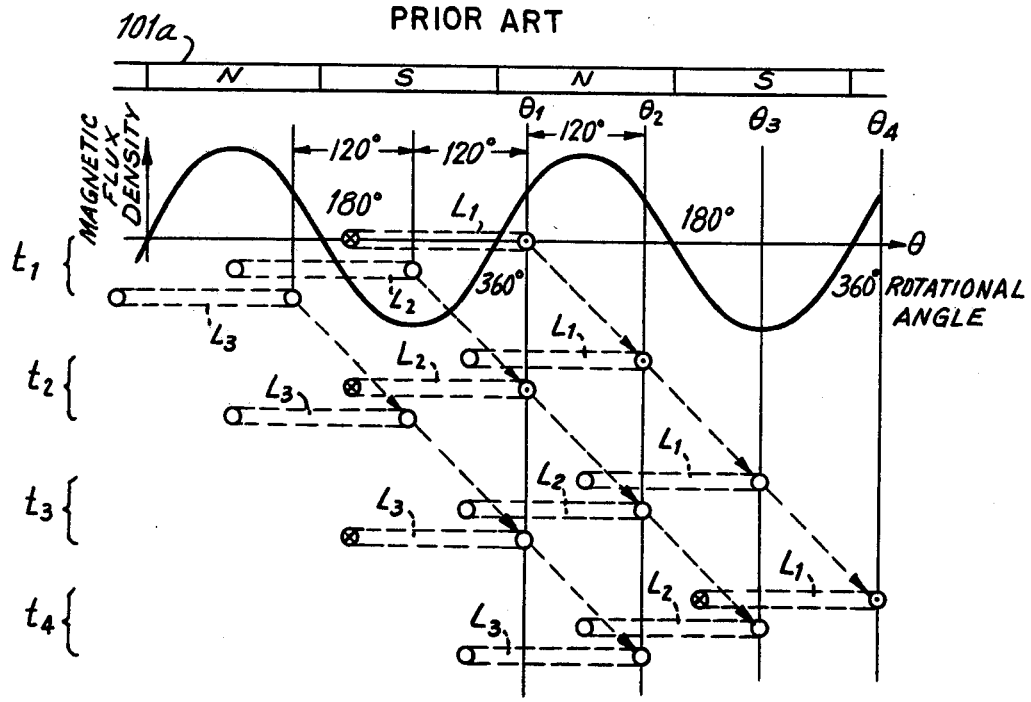
FIGS. 1A–1C represent a prior art 2-pole 3-phase DC motor.

Before discussing the embodiments of the present invention, various problems associated with prior art DC motors first will be described. Referring initially to FIG. 1A, there is illustrated a schematic representation of a 2-pole 3-phase motor. For the purpose of the present invention, it is assumed that the rotor assembly is comprised of differently magnetized permanent magnet pole pieces. Hence, rotor assembly $101a$ is formed of a north pole piece N, having a circumferential arc of 180°, and an adjacent south pole piece S, also having a circumferential arc of 180°. The magnetic flux generated by the north and south pole pieces alternates in magnetic polarity in a sinusoidal wave-form when considered in a rotational path about the motor axis. That is, if a reference point rotates with respect to the north and south pole pieces, the magnetic flux linking that reference point appears as a sinusoid, as shown by the sinusoidal waveform in FIG. 1A. Since the north and south pole pieces constitute rotor assembly $101a$, the reference point actually is fixed and the north and south pole pieces rotate with respect thereto. Nevertheless, the magnetic flux appears as shown.

The stator assembly included in this 2-pole 3-phase motor is formed of three coils $L_1$, $L_2$ and $L_3$. Each coil may be thought of as being wound upon a cylindrical surface concentric with rotor $101a$, and each coil having a conductor segment which conducts current in one direction and another conductor segment which conducts current in the opposite direction. As an example, both conductor segments may be parallel to the motor axis, resulting in each coil $L_1$, $L_2$ and $L_3$ extending over an arc of 180°. As shown in FIG. 1A, current flowing out of the plane of the drawing is represented as a dot and current flowing into this plane is represented as an "X". Accordingly, current flowing out of the plane of the drawing is assumed, for the purpose of the present discussion, to flow in the positive direction, and thus through a positive path of the coil, while current flowing into the plane of the drawing is assumed to flow in the negative direction, and thus through a negative path of the coil. The positive path of coil $L_1$ is phase displaced by 120° from the positive path of coil $L_2$ which, in turn, is phase displaced by 120° from the positive path of coil $L_3$, which is phase displaced by 120° from the positive path of coil $L_1$. Hence, the three phases, or coils $L_1$, $L_2$ and $L_3$ are wound in overlapping relation with respect to each other; yet the positive and negative paths of each coil are separated from each other by 180°.

In operation, when the positive path of coil $L_1$ advances to a point $\theta_1$ into the region of magnetic flux generated by the north pole piece, coil $L_1$ is energized.

In accordance with Fleming's rule, a rotational torque is generated so as to provide rotation between the rotor and stator assemblies. This rotation continues until the positive path of coil $L_2$ arrives at point $\theta_1$. At that time, coil $L_1$ will have reached point $\theta_2$, which is displaced from point $\theta_1$ by 120°. At this time, coil $L_1$ is de-energized and coil $L_2$ is energized. Consequently, rotational torque is generated due to the magnetic flux of north polarity and the positive current flowing through the positive path of coil $L_2$, and also due to the magnetic flux of south polarity and the negative current flowing through the negative path of coil $L_2$. Coil $L_2$ remains energized until the positive path of the next coil $L_3$ reaches point $\theta_1$. At that time, coil $L_2$, whose positive path has reached point $\theta_2$, is de-energized and coil $L_3$ is energized. As a consequence thereof, rotational torque is generated due to the magnetic flux of north polarity and the positive current flowing through coil $L_3$, and also due to the magnetic flux of south polarity and the negative current flowing through coil $L_3$.

Figure 1B:
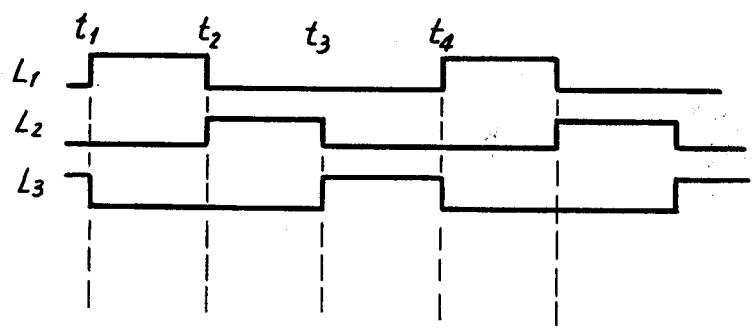
Figure 1C:
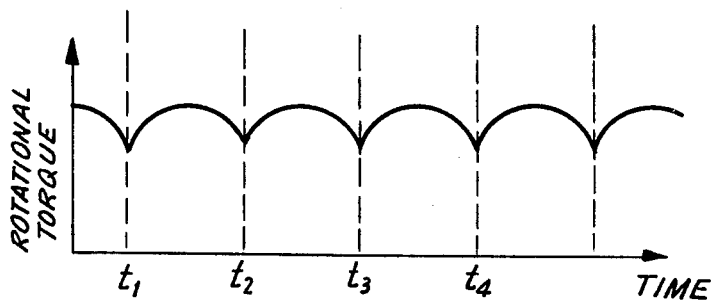

As shown in FIG. 1A, the positive path of coil $L_1$ reaches point $\theta_1$ at the time $t_1$, while the positive path of coil $L_2$ reaches point $\theta_1$ at time $t_2$, and the positive path of coil $L_3$ reaches point $\theta_1$ at time $t_3$. This means that coil $L_1$ is energized from time $t_1$ to time $t_2$. Coil $L_2$ is energized from time $t_2$ to $t_3$. Coil $L_3$ is energized from time $t_3$ to $t_4$. FIG. 1B represents the current energizing waveforms which are associated with coils, $L_1$, $L_2$ and $L_3$, respectively. Since each coil is energized only for a duration that the positive path thereof is within the range of magnetic flux having north polarity, it is appreciated that the rotational torque generated in response to each energization of the respective coils always is greater than zero. FIG. 1C is a waveform representation of the generated rotational torque. It is seen that positive torque due to the energization of coil $L_1$ is generated from $t_1$ to $t_2$; positive torque due to the energization of coil $L_2$ is generated from $t_2$ to $t_3$; and positive torque due to the energization of coil $L_3$ is generated from $t_3$ to $t_4$. This sequential energization of the coils, and resultant torque, then is repeated.

Figure 2A:
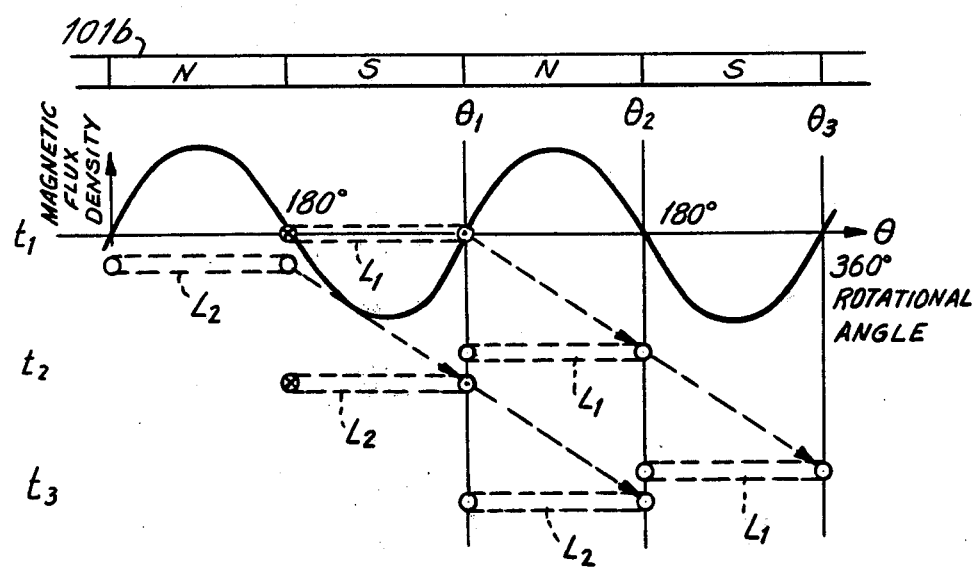
FIGS. 2A–2C represent a prior art 2-pole alternate phase DC motor.

Since each coil must be separately energized for a duration of 120°, and since each coil must be energized only when its positive path reaches point $\theta_1$, an individual position sensing element must be provided for each coil so as to detect when that coil reaches point $\theta_1$. These three position sensing elements then can be used to generate the energizing currents at the proper times, and as shown in FIG. 1B. Furthermore, three separate coil energizing circuits, or switching circuits, are needed to energize coils $L_1$, $L_2$ and $L_3$, respectively. As mentioned above, the location of each position sensing element with respect to the remaining position sensing elements, and also with respect to the north and south pole pieces must be carefully established. This means that the angular relation of each position sensing element must be individually adjusted during the motor assembly operation. Furthermore, if all three position sensing elements are provided in a single package module, this module can be used only for motors of the same diameters. These problems are disadvantageous in the construction and assembly of a DC motor. Referring now to FIG. 2A, there is illustrated one example of a 2-pole alternate phase motor wherein rotor assembly $101b$ is comprised of adjacent north and south magnetic pole pieces each forming an arc of 180°. The stator assembly is shown as comprising two coils $L_1$ and $L_2$, each of these coils having positive and negative paths, as discussed previously with respect to FIG. 1A, the positive and negative paths of each coil being separated from each other by 180°. Here coils $L_1$ and $L_2$ do not overlap. Rather, each coil is coextensive with a magnetic pole piece. Accordingly, each coil may be wound upon the same cylindrical surface concentric with the motor axis. As before, the positive and negative paths may be thought of as conductor segments parallel to the motor axis for conducting currents in opposite directions.

As rotor assembly $101b$ rotates, the magnetic flux linking a reference point appears as a sinusoidal waveform, as shown in FIG. 2A. When the positive path of coil $L_1$ reaches point $\theta_1$, that is, when the positive path of the coil reaches the transition between north and south magnetic flux where the effective flux is zero, the coil is energized. The duration of energization of coil $L_1$ is 180°, that is, until the positive path of this coil reaches point $\theta_2$ at the next transition between north and south magnetic flux. At that time, the positive path of coil $L_2$ has reached point $\theta_1$ and coil $L_2$ is energized while coil $L_1$ is deenergized. Then, when the positive path of coil $L_1$ once again reaches point $\theta_1$, coil $L_2$ is de-energized and coil $L_1$ is energized.

Figure 2B:
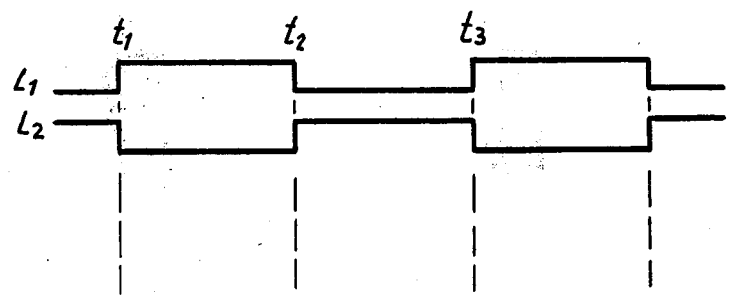
Figure 2C:
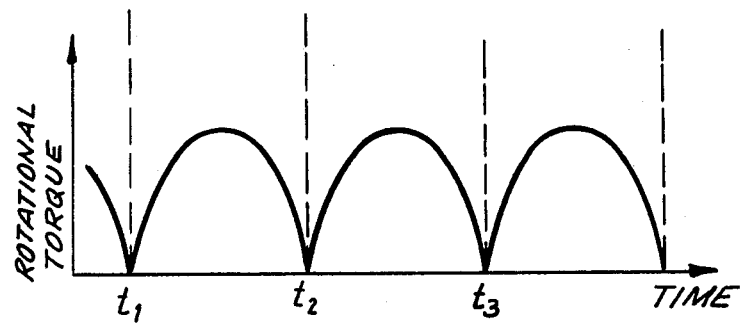

FIG. 2B represents the current waveform of the energizing currents flowing through coils $L_1$ and $L_2$. Coil $L_1$ is energized at time $t_1$, that is, at the time the positive path of this coil reaches point $\theta_1$. Coil $L_2$ is energized at time $t_2$, that is, at the time the positive path of this coil reaches point $\theta_1$. Hence, a positive torque is generated as a result of the positive current flowing through the positive path of coil $L_1$ and the magnetic flux of north polarity; and also due to the negative current flowing through the negative path of coil $L_1$ and the magnetic flux of south polarity which links this negative path. Similarly, when coil $L_2$ is energized, positive torque again is generated as a result of the positive current flowing through the positive path of coil $L_2$ and the magnetic flux of north polarity; as well as a result of the negative current flowing through the negative path of coil $L_2$ and the magnetic flux of south polarity linking that negative path. A waveform representation of this torque is illustrated in FIG. 2C.

It is seen that at times $t_1$, $t_2$, $t_3$, . . . the rotational torque which is generated is reduced to zero. This is because, at these times, the positive and negative paths of an energized coil are linked with substantially zero magnetic flux. Because of this zero torque, there is the possibility that if the rotor is stopped at a position wherein the positive (or negative) path of a coil is at point $\theta_1$ (or $\theta_2$), the subsequent energization of the coil will result in zero torque. This means that an auxiliary starting means may be necessary to impart initial rotation to the rotor. Although the 2-pole alternate phase motor apparently needs only a single position sensing element to detect the rotational position of the rotor with respect to the energizing coils, and only two switching circuits are needed to energize the respective coils, the attendant problem of zero torque at selected angular locations of the rotor is disadvantageous. Furthermore, a substantial ripple is exhibited by the generated torque, as shown in FIG. 2C. This also is disadvantageous.

Figure 3:
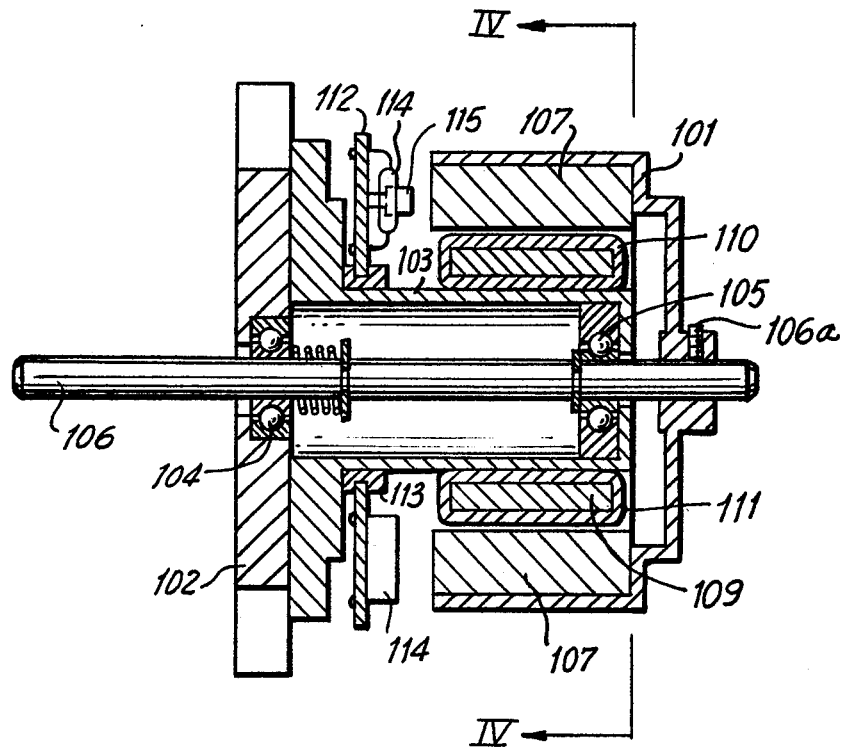
FIGS. 3–5 A and B represent one embodiment of a DC motor in accordance with the present invention.
Figure 4:
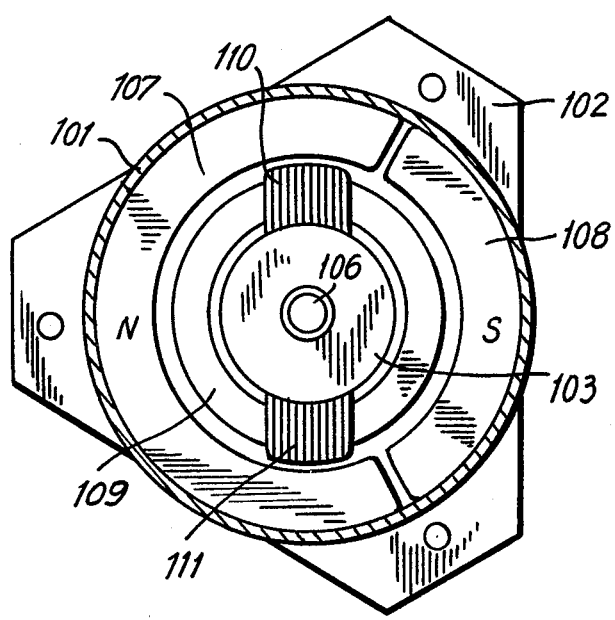

The foregoing problems associated with the motors of FIGS. 1 and 2 are avoided in accordance with the present invention, one embodiment being shown in the plan view of FIG. 3 and the sectional view taken along lines IV—IV and shown in FIG. 4. In this embodiment, rotor assembly 101 is an outer rotor which circumscribes and rotates about the stator assembly. Rotor assembly 101, hereinafter, simply a rotor, is a cup-shaped yoke fixed to an end portion of a rotatable shaft 106. Shaft 106 is rotatably supported by a cylindrical support member 103 having a central, axis opening therein, one end of this opening being provided with a bearing 104 and the other, opposite opening being provided with a bearing 105. Cylindrical support member 103, together with bearings 104 and 105 and shaft 106, is mounted on a support plate 102. As shown, one end of shaft 106 extends outwardly from support plate 102 and is adapted to drive a member secured thereto. As one example, shaft 106 may be used to drive a rotary drum in a video tape recorder (VTR). Of course, various other examples of apparatus with which the illustrated motor can be used are contemplated, and the particular device to which shaft 106 is secured forms no part of the present invention per se.

The other end of shaft 106 is secured to rotor 101 by a set screw 106a. Rotor 101 includes a permanent magnet north pole piece 107 and a permanent magnet south pole piece 108. Pole pieces 107 and 108 are secured to the inner cylindrical side walls of the cup-shaped yoke and are magnetized in the thickness direction such that the north and south poles face inwardly, that is, toward shaft 106, as shown more clearly in FIG. 4. North pole piece 107 subtends an angle of 240° with respect to the motor axis, and south pole piece 108 subtends and angle of 120°. That is, north pole piece 107 is an arcuate segment of 240° while south piece 108 is an arcuate segment of 120°. In the present embodiment, since only one pair of poles is provided, the "electrical" angle subtended by each pole piece is equal to its "positional" angle. For the purpose of this and the following description, a "positional" angle is a geometric angle between two points on the rotor or on the stator. The "electrical" angle is equal to the "positional" angle divided by the number of pairs of poles.

The stator assembly, hereinafter, simply the stator, is secured to the cylindrical support member 103. The stator is formed of a toroidal core 109 which is concentric with the motor axis, and a pair of coils 110 and 111, each coil being wound toroidally on core 109. Coils 110 and 111 are spaced apart from each other by 180°. That is, the central portion of coil 110, as viewed in FIG. 4, is 180° from the central portion of coil 111. Thus, these coils are diametrically opposite to each other. A small gap is provided between the inner circumferential surface of pole pieces 107 and 108 and the outer circumferential surfaces of coils 110 and 111.

Cylindrical support member 103 is provided with a flange by which it is mounted upon side plate 102. An annular mounting plate 113 is provided on cylindrical support member 103 for supporting circuit board 112. As one example, annular mounting plate 113 may be formed of synthetic resin. A drive circuit 114 is attached to circuit board 112, and leads (not shown) from coils 110 and 111 also are connected to circuit board 112. Energizing circuit 114 thus is adapted to selectively energize one or the other of coils 110, 111 so as to generate a rotational torque whereby rotor 101 is rotated. In this regard, a position sensing element 115, such as a Hall-effect device, is provided for the purpose of sensing the rotational position of rotor 101 and to generate suitable signals in response thereto so as to control energizing circuit 114. Hall-effect device 115 may sense the intensity and polarity of the magnetic flux generated by north and south pole pieces 107, 108, thereby producing position signals as a function of such detected flux. As another example, position sensing element 115 may comprise an optical sensor capable of sensing optical indicia provided at discrete locations on rotor 101. As may be appreciated by those of ordinary skill in the art, other embodiments of position sensing element 115 also can be used if desired.

Figure 5A:
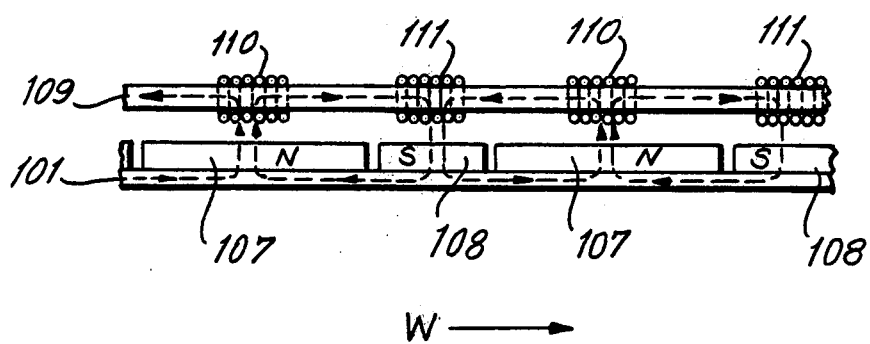

A developed view of rotor 101 and stator coils 110, 111 is shown in FIG. 5A. A magnetic circuit is formed of north pole piece 107, core 109, south pole piece 108 and the cup-shaped yoke of rotor 101. The magnetic flux which traverses this closed loop is shown by the broken lines in FIG. 5A. Current is supplied to coils 110 and 111 such that current flows out of the plane of the drawing through the conductors of each coil which are closer to the pole pieces, and current flows into the plane of the drawing through those conductors of each coil which are farther away from the pole pieces. Hence, the conductors which face the pole pieces are designated as the positive path while the conductors which are farther from the pole pieces are designated as the negative path. It is appreciated that the flux which links the positive path of an energized coil is greater than the flux which links the negative path because of the particular configuration of the illustrated magnetic circuit. Thus, using Fleming's rule, if coil 110 is energized when it is juxtaposed north pole piece 107, a torque is generated to produce rotation in the direction W, as indicated by the arrow. Of course, an opposite torque is produced as a result of the magnetic flux of north polarity and the negative current flowing through the negative path of coil 110. However, because of the reduced flux which links this negative path, the opposite, counteracting torque is substantially reduced. The overall torque thus is in the direction W. As will be described below, coil 110 is energized for only a portion of the angular duration that it is linked with the magnetic flux of north polarity. Hence, coil 110 is energized only after it is within the vicinity of this magnetic flux, and then it is de-energized prior to the time that it passes out of this vicinity. Coil 111 is similarly energized, following the energization of coil 110.

It is seen that the positive and negative paths of each coil 110, 111 are separated from each other by the thickness of core 109. This differs from the separation of 180°, as in coils $L_1$, $L_2$ and $L_3$ of the prior art motor shown in FIG. 1A. This 180° separation is needed in the prior art motor so as to generate torque in a predetermined direction due to the magnetic flux of north polarity which links the positive current and the magnetic flux of south polarity which links the negative current. However, in the embodiment shown in FIG. 5A, torque is generated in a predetermined direction primarily due to the magnetic flux of north polarity which links the positive current. Only a very small opposite torque is generated because of the negative current which flows through the negative path of the energized coil. Since north pole piece 107 is shown in FIG. 5A as extending over an angle greater than 180°, if coils 110 and 111 were wound in the manner shown in FIG. 1A, it is possible that both the positive and negative paths of the same coil would concurrently be linked with magnetic flux of the same polarity. This would mean that equal and opposite torques would be generated at that time. This difficulty is avoided by the winding configuration shown in FIGS. 3, 4 and 5A. Furthermore, if each coil is wound on the same cylindrical surface such that the positive and negative paths likewise are disposed on the same surface, then the number of turns of the coil is a function of the angular separation between the positive and negative paths. That is, and with reference to the coils shown in FIG. 1A, the number of turns in each coil is limited by the 180° angular separation between the positive and negative paths thereof. However, by winding coils 110 and 111 toroidally on core 109, the number of turns of each coil can be increased without this limitation. That is, and as shown more clearly in FIG. 5A, the number of turns of a coil is not limited by the angular separation between the positive and negative paths.

Figure 5B:
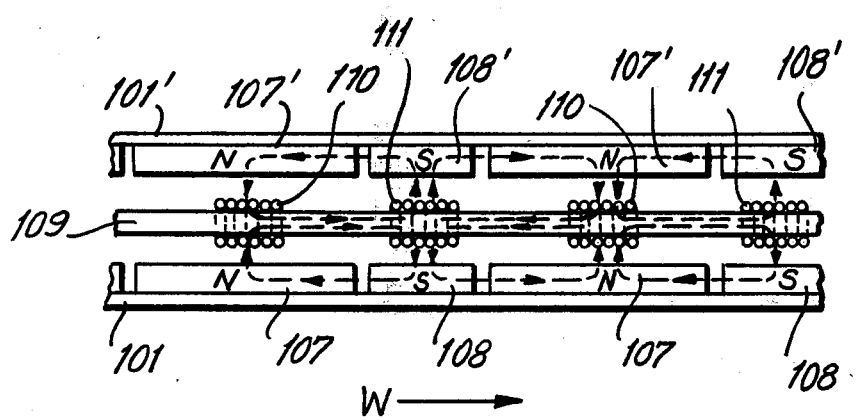

A modification of the embodiment shown in FIGS. 3 and 4 is illustrated in a developed view in FIG. 5B. In this modification, an additional rotor 101' is provided. This additional rotor may be disposed interiorally of core 109 and may be secured to outer rotor 101 so as to be rotatable therewith. Inner rotor 101' may be provided with magnetic north pole piece 107' and magnetic south pole piece 108', these inner pole pieces being aligned with and symmetrical to outer pole pieces 107 and 108, respectively. The respective magnetic circuits formed between outer rotor 101 and core 109, and inner rotor 101' and core 109 are shown by broken lines. Using Fleming's rule, it is seen that the magnetic flux of north polarity generated by north pole piece 107' of inner rotor 101' links the negative path of coil 110 so as to generate a torque in the direction W. Thus, torque which is generated as a result of the inner rotor is in the same direction as the torque which is generated as a result of the outer rotor. Consequently, and because of these aiding torques, the DC motor is highly efficient.

Although permanent magnet pole pieces 107' and 108' are symmetric with respect to permanent magnet pole pieces 107 and 108, this symmetry is not an absolute requirement. For example, permanent magnet pole pieces 107' and 108' each may extend for an angle of 180°. Although the torque due to the inner rotor 101' and the negative path of each energized coil thus may be reduced to zero, as in the prior art 2-pole alternate phase motor shown in FIGS. 2A–2C, the net torque is not so reduced because of the asymmetry of permanent magnet pole pieces 107 and 108 of outer rotor 101.

In the embodiment shown in FIG. 5B, it is assumed that coils 110 and 111 are radially spaced from outer rotor 101 and inner rotor 101'. As an alternative, rotors 101 and 101' may be constructed as discs, and coils 110 and 111 may be axially spaced from these disc-shaped rotors and disposed intermediate such discs.

Figure 6A:
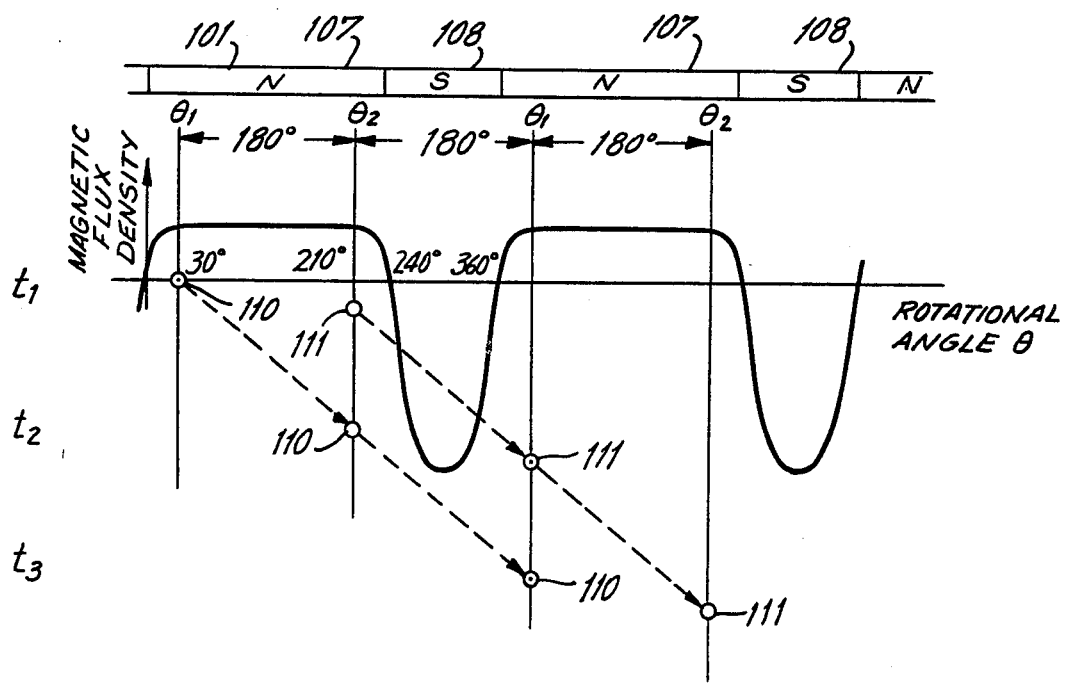
FIGS. 6A–6C are useful in explaining the operation of this embodiment of the DC motor.

Returning to the embodiment shown in FIG. 5A, the magnetic flux generated by north pole piece 107 and south pole piece 108 in a rotary path about the axis of the motor is shown by the waveform in FIG. 6A. The magnetic flux distribution due to north pole piece 107 is seen to be substantially trapezoidal and extends over a positional angle greater than 180°. The magnetic flux distribution due to magnetic south pole piece 108 is substantially sinusoidal and extends for a positional angle substantially less than 180°. In the example wherein it is assumed that north pole piece 107 extends for 240°, the trapezoidal flux distribution due to the north pole piece likewise is seen to extend for 240°. The magnetic flux of south polarity thus extends for 120°.

FIG. 6A also represents the positive path of each coil 110, 111. When the positive path of coil 110 extends into the magnetic flux of north polarity by an angle of 30°, coil 110 is energized. This energization extends for a duration of 180°, at which time the positive path of coil 111, which is 180° displaced from coil 110, extends into the magnetic flux of north polarity by an angle of 30°. At that time, coil 110 is de-energized and coil 111 is energized. Thus, coil 110 is energized from point $\theta_1$ to point $\theta_2$, the latter being displaced from point $\theta_1$ by 180°. Similarly, coil 111 is energized from point $\theta_1$ to point $\theta_2$. At point $\theta_1$, the magnetic flux of north polarity is of almost constant magnitude. Thus, the torque which is generated as a result of this substantially constant flux linked with the energized coil exhibits minimal ripple.

Figure 6B:
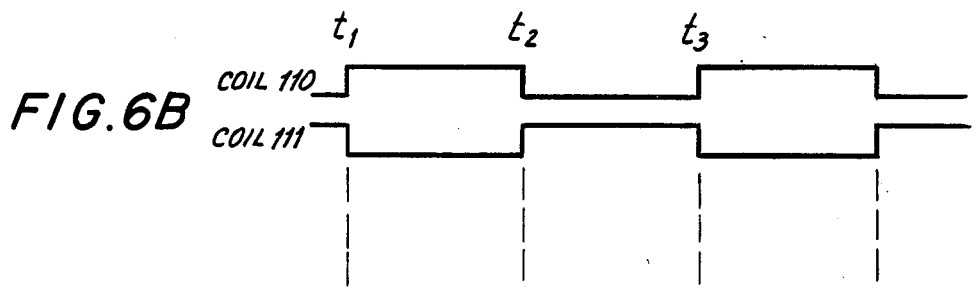

FIG. 6B illustrates the energizing current waveforms associated with coils 110 and 111, respectively. Thus, coil 110 is energized at time $t_1$ when the positive path thereof reaches point $\theta_1$. This energization continues for 180° until time $t_2$. At that time, coil 110, whose positive path has reached point $\theta_2$, is de-energized; while coil 111, whose positive path has reached point $\theta_1$, is energized. Coil 111 then is energized for a duration of 180°, at which time $t_3$ this coil is de-energized and coil 110 is energized once again.

Figure 6C:
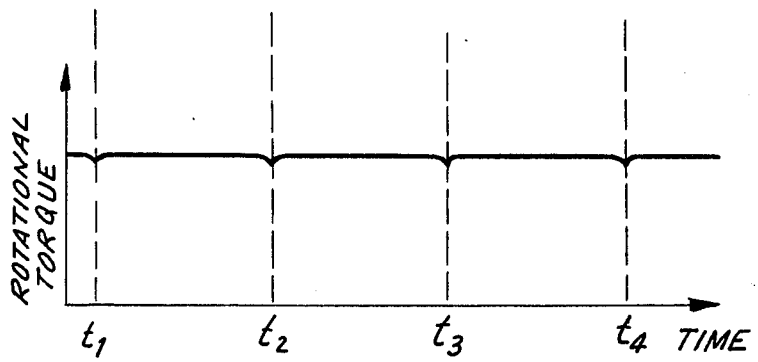

FIG. 6C represents the waveform of the rotational torque which is produced as a result of the energization of coils 110 and 111 in the manner shown in FIG. 6B. This torque is substantially constant, with minimal ripple, because each coil is energized at a time that it is linked with magnetic flux of substantially constant magnitude, and for a duration during which the magnitude of this flux remains constant. During the duration that a coil is energized, the magnetic flux linked therewith is not reduced to zero. Thus, the problem of zero torque associated with the aforedescribed prior art 2-pole alternate phase motor is avoided. Because of the practically negligible ripple in the generated torque (FIG. 6C), the DC motor of the present invention can be used as a drive motor for a VTR, a capstan drive motor for a tape recorder, a drive motor for a video disc player and the like, such a drive motor exhibiting substantially constant drive characteristics, thus providing advantageous performance.

It is seen from FIG. 6A, that if a coil, for example, coil 110, is energized throughout the region of magnetic flux having north polarity, the resultant torque which is generated thereby is produced through an angular range having an electrical angle greater than 180°. Accordingly, position sensing element 115 (FIG. 3) is used to detect when the positive path of coil 110 reaches point $\theta_1$; that is, position sensing element 115 senses when the positive path of coil 110 extends by angle of 30° into the magnetic flux distribution generated by north pole piece 107. This same position sensing element 115 also may detect when rotor 101 has been rotated by 180° from point $\theta_1$. Thus, the position sensing element also may detect when the positive path of coil 110 extends by an angle of 210° into the magnetic flux distribution generated by north pole piece 107. These sensed positions of rotor 101 are used to generate change-over signals for controlling the alternate energization of coils 110 and 111.

As an example, if position sensing element 115 is a Hall effect device, it may detect the magnetic flux from north pole piece 107 which exceeds the magnitude at point $\theta_1$. Since this magnitude is exceeded throughout the range of $\theta_1$ to $\theta_2$, the Hall effect device would produce a change-over signal of the type associated with the energizing current of coil 110, as shown in FIG. 6B. Once this change-over signal is produced, the reciprocal thereof can be used to energize coil 111. As mentioned above, position sensing element 115 may, in the alternative, comprise an optical position sensor, and suitable detectable indicia may be provided on rotor 101 so as to properly activate the optical sensor. As yet another alternative, position sensing element 115 may be adapted to detect only the positive-going zero crossing of the magnetic flux distribution shown in FIG. 6A. Suitable delay circuits then can be used to generate the change-over signals (FIG. 6B) at times $t_1$, $t_2$, . . . in response to these detected positive-going zero crossings.

Figure 7A:
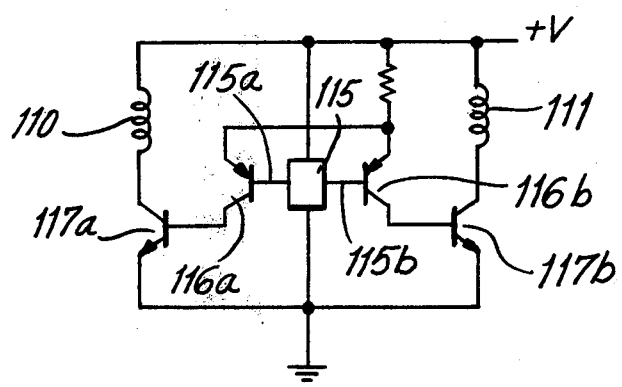
FIGS. 7A and 7B shows one embodiment of a coil-energizing circuit, and its manner of operation, useful with this embodiment of a DC motor.
Figure 7B:
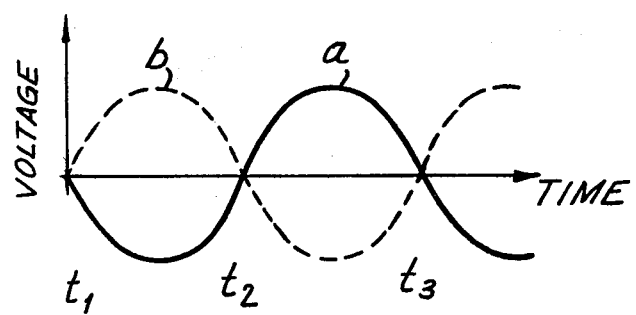

One example of energizing circuit 114 which can be used with position sensing element 115 to selectively energize coils 110 and 111 is shown schematically in FIG. 7A. Position sensing element 115 here is assumed to be a Hall-effect device having output terminals 115a and 115b. Output terminal 115a is coupled to the base electrode of a PNP transistor 116a whose emitter electrode is connected through a load resistor to a suitable source of operating potential $+V$ and whose collector electrode is connected to the base electrode of a current switching transistor 117a. Similarly, output terminal 115b is connected to the base electrode of a PNP transistor 116b whose emitter electrode is connected in common with the emitter electrode of transistor 116a and whose collector electrode is connected to the base electrode of a switching transistor 117b. The collector-emitter circuits of transistors 117a and 117b are connected in series with coils 110 and 111, respectively. As rotor 101 rotates, the magnetic flux generated by north and south pole pieces 107 and 108 is detected by Hall-effect device 115 to generate output voltages a and b, shown in FIG. 7B, at output terminals 115a and 115b, respectively. It is seen that, although the north and south pole pieces are asymmetric with respect to each other, and particularly, north pole piece 107 extends for an arcuate angle of about 240° while south pole piece 108 extends for an arcuate angle of about 120°, output voltages a and b produced by Hall-effect device 115 are symmetrical with respect to each other. Output voltage a is amplified by transistor 116a and inverted so as to render transistor 117a conductive from time $t_1$ to $t_2$. Similarly, output voltage b is amplified by transistor 116b and inverted thereby so as to render transistor 117b conductive from time $t_2$ to $t_3$. Consequently, energizing currents flow through coils 110 and 111, respectively, as shown by the waveforms in FIG. 6B. That is, current flows alternately through coils 110 and 111 for an angular duration of 180° while the energized coil is within the range of magnetic flux having north polarity. Transistor 117a is energized when coil 110 rotates from position $\theta_1$ to position $\theta_2$; and transistor 117b is energized when coil 111 rotates from position $\theta_1$ to position $\theta_2$.

Although the embodiment shown in FIG. 7A energizes coils 110 and 111 alternately, each for a duration of 180°, the duration of such alternate energization can be varied. For example, coil 110 can be energized for a duration greater than 180°, while coil 111 is energized for a lesser duration. Of course, this duration of energization is dependent upon the arcuate length of the coil, the angular extent of magnetic flux of north polarity and the point within this magnetic flux at which the coil is energized.

If position sensing element 115 is constructed as a different element, such as an optical position sensing element, the output from this element, such as voltage a (FIG. 7B) can be used to energize coil 110, while a polarity-inverted version, such as voltage b (FIG. 7B) can be produced to energize coil 111.

In the embodiment of FIGS. 3, 4 and 6, it is assumed that one magnetic pole piece extends over an arc of 240° while the other magnetic pole piece extends over an arc of 120°. However, this 2:1 ratio is not critical. Rather, it is important simply that permanent magnet pole pieces 107 and 108 are asymmetrical with respect to each other. For example, one of these pole pieces may extend over an arcuate angle of 270°, while the other pole piece extends over an arcuate angle of 90°. Coils 110 and 111 then may be energized for equal durations of 180° each, or for different durations, for example, 240° and 120°, respectively.

If one magnetic pole piece extends over an arcuate angle which is too large with respect to the arcuate angle of the other pole piece, the magnetic flux is so densely concentrated into the smaller pole piece as to saturate it. Hence, the magnetic flux which links coils 110 and 111 exhibits a reduced magnetic flux density. This means that in the graphical representation of magnetic flux density as shown in FIG. 6A, the magnitude over the range of $\theta_1$ to $\theta_2$ is reduced. As a result thereof, the rotational torque due to this magnetic flux likewise is reduced. Hence, it is preferred that the arcuate extent of the north and south pole pieces be sufficient that the magnitude of the magnetic flux density generated by one of these pole pieces is at least equal to some predetermined value which is substantially constant over as wide an angular range as possible. For example, the arcuate extent, or circumferential dimension, of one magnetic pole piece may be between 220° to 280°, while the angular extent, or circumferential dimension, of the other magnetic pole piece is in the range of 80° to 140°. As a still further limitation, the larger magnetic pole piece may exhibit a circumferential dimension of from 240° to 260°, while the smaller magnetic pole piece may exhibit a circumferential dimension of from 100° to 120°.

In the foregoing example, it has been assumed that the arcuate extent, or circumferential dimension, of the north pole piece is greater than that of the south pole piece. If desired, this can be reversed, and the south pole piece can be larger than the north pole piece. Furthermore, it has been assumed that the motor is a simple 2-pole motor. However, the foregoing principles are equally applicable to a 4-pole or 2n-pole motor, as desired. In that event, the foregoing description of angular extent, angular duration and angular position should be understood as referring to "electrical" angle.

Furthermore, the arcuate extent, or circumferential dimension, of coils 110 and 111 has not been specified. However, it should be appreciated that these coils are diametrically opposed with respect to each other and each is angularly (circumferentially) smaller than at least the larger pole piece.

In accordance with the construction of the DC motor, as described above with respect to FIGS. 3-7, the rotational torque is not reduced to zero at any point of the rotation of the rotor through an angle of 360 electrical degrees. Since the magnetic flux density which is linked with the energized coil throughout substantially the entire duration of such energization is constant, the rotational torque exhibits only negligible ripple. Because only the positive (or negative) path of each coil is linked with magnetic flux of substantial magnitude, opposite rotational torques are not generated by reason of the positive and negative currents flowing through the energized coil.

A comparison of the torque waveform shown in FIG. 6C with the torque waveform shown in FIG. 1C indicates a substantial improvement of the present invention over prior art 2-pole 3-phase motors. This improvement is attained with a concommitent reduction in the number of position sensing elements which must be used and the complexity of the coil energizing circuit. Hence, the cost of manufacturing the motor in accordance with the present invention is advantageously reduced. Furthermore, the coil drive circuit easily can be formed as an integrated circuit. Since only a single position sensing element is used with the present invention, any positional adjustment of that element with respect to the coils is relatively simple. Also, the same single position sensing element can be used for motors of different diameters. This means that standardized parts for motors of different dimensions can be achieved. This adds to a further reduction in the overall cost of manufacturing and assembling such motors.

Figure 8C:
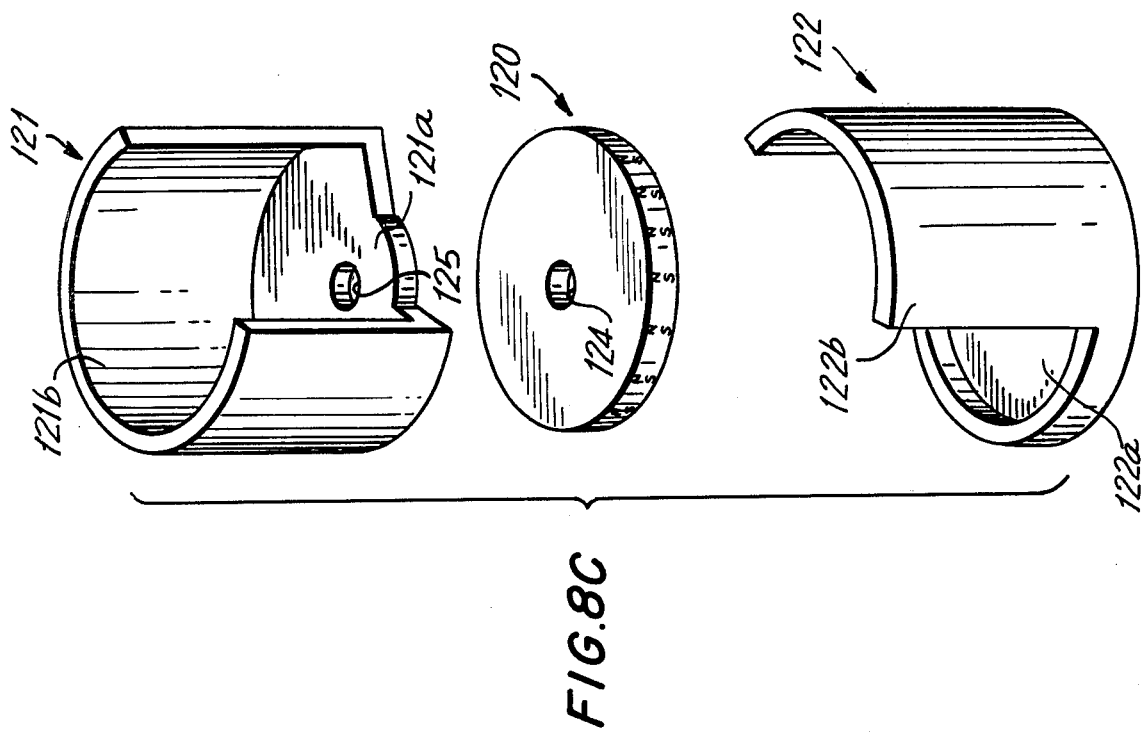
FIGS. 8A–8C represent a modification of this embodiment of the DC motor.
Figure 8A:
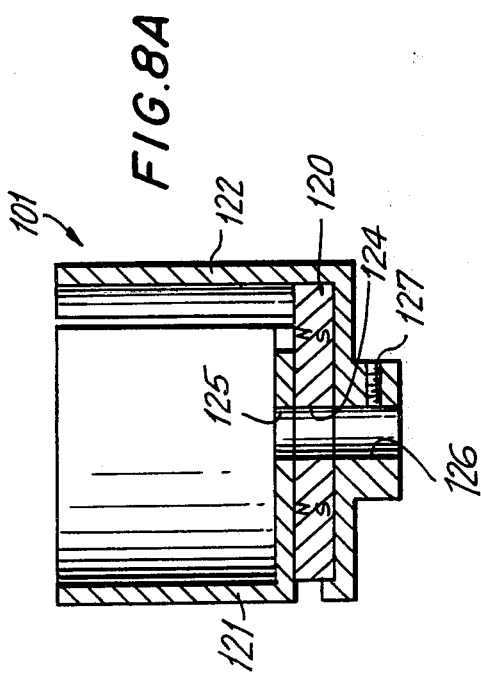
Figure 8B:
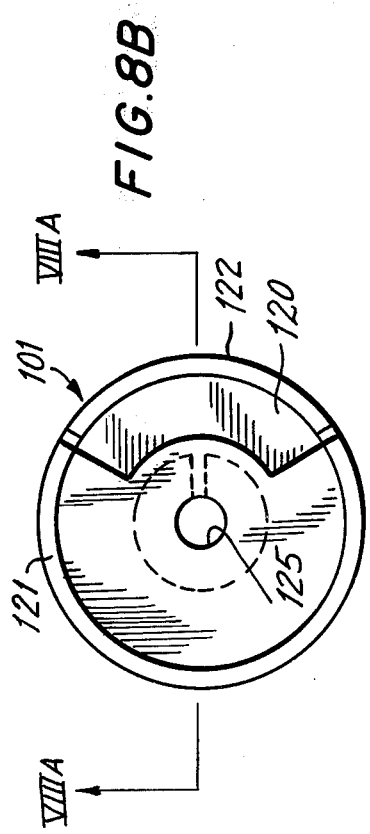

Rotor 101, shown in FIGS. 3 and 4, can be modified as illustrated in FIGS. 8A-8C, wherein FIG. 8B is a top view of the modified rotor 101, FIG. 8A is a sectional view taken along lines VIIIA—VIIIA of FIG. 8B, and FIG. 8C is an exploded view. A disc-type permanent magnet 120, magnetized in its thickness direction, is interposed between yokes 121 and 122 formed of magnetic path forming members. In particular, yoke 121 is in magnetic contact with the north pole of disc-magnet 120 and yoke 122 is in magnetic contact with the south pole of disc-magnet 120. Yoke 121 is provided with a semi-cylindrical side wall 121b which extends over an arcuate range, or circumferential dimension, of about 240°. A centrally disposed opening 125 is provided in a base or bottom wall 121a of yoke 121 and is adapted to receive motor shaft 106.

Yoke 122 is provided with a similar semi-cylindrical wall 122b which extends over an arcuate range, or circumferential dimension, of about 120°. Yoke 122 is provided with a cup-like base 122a in which a centrally disposed opening 126 is provided, opening 126 being aligned with opening 125 so as to receive shaft 106 therethrough. A set screw 127 mounted on a collar of yoke 122 is provided to secure yokes 121 and 122 to the shaft. Disc-magnet 120, which also is provided with a centrally-disposed opening 124, is secured to bottom wall 121a of yoke 121 and cup-like base 122a of yoke 122, as shown in FIG. 8A.

It is appreciated that yokes 121 and 122 generate magnetic flux having the distribution shown in FIG. 6A. Hence, yokes 121 and 122 are analogous to pole pieces 107 and 108, respectively. Stator coils 110 and 111 (not shown) are adapted to be mounted within yokes 121 and 122, analogous to the mounting of the stator structure shown in FIGS. 3 and 4. Accordingly, further description of the operation of and advantages derived from the embodiment shown in FIGS. 8A-8C is not provided.

The embodiments shown in FIGS. 3-8 are of the so-called radial air gap type of DC motor. That is, in these embodiments, rotor 101 is radially spaced from the stator assembly. Although the rotor is shown as the outer-rotor type, the radial air gap type of motor nevertheless can be constructed as an inner-rotor type. As yet another modification in accordance with the teachings of the present invention, the DC motor may be of the so-called axial air gap type wherein the rotor and stator assemblies are axially spaced apart from each other. An example of an axial air gap type of DC motor is shown in the plan view of FIG. 9 and sectional views of FIGS. 10 and 11 taken along lines X—X and XI—XI of FIG. 9. In this embodiment, the same reference numerals are used to identify those components which have been described previously.

In the illustrated axial air gap type of motor, the motor is provided with four poles, such as north pole pieces 107a, 107b and south pole pieces 108a, 108b, which are circumferentially arranged alternately within the cup-shaped yoke of rotor 101, as shown in FIGS. 9 and 11. One pair of pole pieces is formed of north pole piece 107a and adjacent south pole piece 108a; and the other pair of poles is formed of north pole piece 107b and adjacent south pole piece 108b. In each pair, the north and south pole pieces are asymmetric with respect to each other, and the north pole piece in one pair is diametrically opposed to the north pole piece in the other pair, while the south pole piece in one pair is diametrically opposed to the south pole piece in the other pair. The circumferential dimension of north pole piece 107a is equal to about 240 electrical degrees, which corresponds to a positional angle of 120°, while south pole piece 108a has a circumferential dimension of 120°, which corresponds to a positional angle of 60°. North pole piece 107b and south pole piece 108b exhibit similar circumferential dimensions.

Annular core 109 is provided with four coils 110a, 110b, 111a and 111b wound toroidally thereon. Adjacent coils are spaced apart from each other by a positional angle of 90°. Coils 110a and 110b are diametrically opposed to each other and are connected in series; as are coils 111a and 111b. As clearly shown in FIG. 9, the respective coils are spaced axially from the pole pieces. Hence, the pole pieces are magnetized in the axial direction so as to provide suitable north and south poles in facing relation to coils 110a-111b.

As can be seen from FIG. 9, coil 111a is provided with a positive (or negative) path which is formed of a conductor that extends in the radial direction. Thus, the positive (or negative) path of coil 111a is closer to north pole piece 107b than is the negative (or positive) path thereof. A similar relation is provided between coil 111b and north pole piece 107a, coil 110a and south pole piece 108a and coil 110b and south pole piece 108b. The magnetic flux distribution attributed to the north and south pole pieces is as shown in FIG. 6A, with the understanding that the angular positions are electrical angles rather than positional angles. Hence, rotational torque is generated by, for example, the interaction of coil 111a and pole piece 107b which generates a magnetic flux of north polarity linked with coil 111a, and a similarly directed torque generated by the magnetic flux of pole piece 107a linking with coil 111b. Coils 111a and 111b are energized for an angular duration of 180°, and then coils 110a and 110b are energized for an angular duration of 180°.

Only one position sensing element 115 need be provided to detect the angular position of rotor 101 for selectively energizing the respective coils. When one coil reaches the angular position $\theta_1$ (FIG. 6A), it is energized together with the diametrically opposed series-connected coil. This energization continues until the energized coils reach angular position $\theta_2$, at which time the series-connected coils are de-energized and the other diametrically opposed series-connected coils are energized. Position sensing element 115 detects when angular positions $\theta_1$ and $\theta_2$ are reached so as to selectively control, or change over, the energization of coils 110a, 110b and coils 111a, 111b. The drive circuit shown in FIG. 7A can be used as drive circuit 114. Hence, rotational torque having the waveform shown in FIG. 6C is generated by the embodiment shown in FIGS. 9–11.

Figure 12:
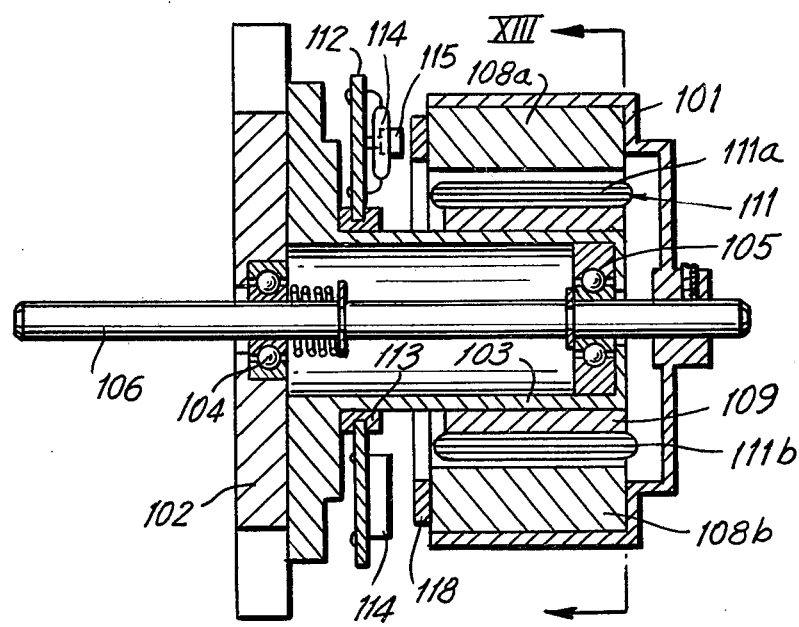
FIGS. 12–13 represent another embodiment of the DC motor in accordance with the present invention.
Figure 13:
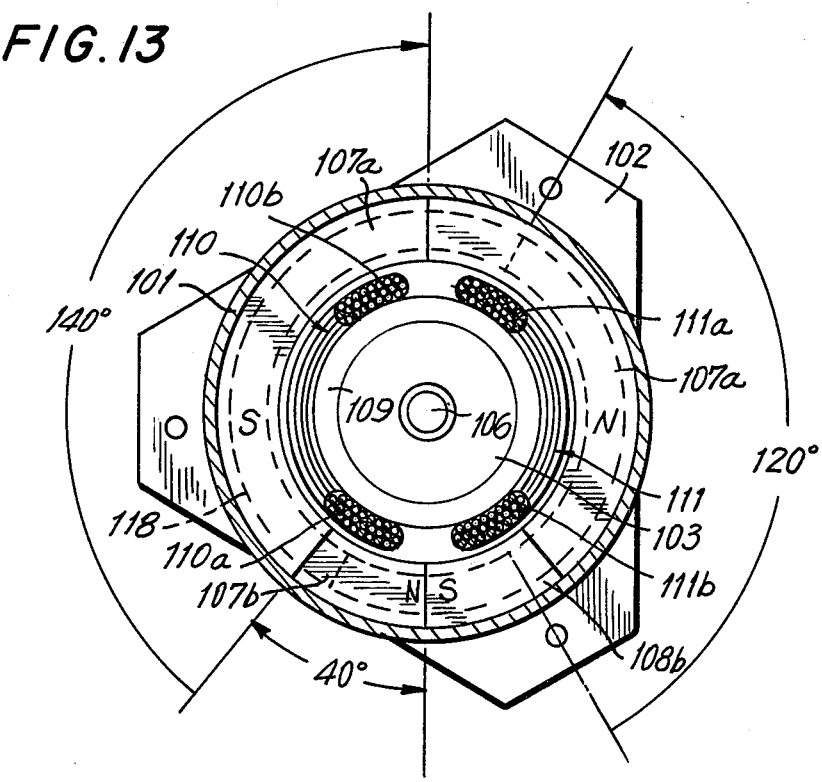

In the embodiments described above with respect to FIGS. 3–11, the coils are wound toroidally on a toroidal core. Referring now to FIGS. 12 and 13, wherein the same reference numerals as used previously are used herein to identify like component parts, the coils are wound on a cylindrical surface concentric with the axis of the motor. More particularly, FIG. 12 is a plan view of another embodiment of the present invention, and FIG. 13 is a sectional view taken along lines XIII—XIII in FIG. 12. North pole piece 107 here is shown as north pole piece 107a and south pole piece 108 here is shown as south pole piece 108a. Pole pieces 107a and 108a have equal circumferential dimensions, each being shown herein as about 140°. Auxiliary north pole piece 107b and auxiliary south pole piece 108b are interposed between north and south pole pieces 107a and 108a so as to complete the 360° circumference of pole pieces. Auxiliary north pole piece 107b and auxiliary south pole piece 108b each are seen to have circumferential dimensions of about 40°. Furthermore, the north and south auxiliary pole pieces are seen to alternate in polarity with the main north and south pole pieces 107a and 108a so as to provide north, south, north, south magnetic flux in a rotary path about the motor axis.

Coils 110 and 111 are provided on a cylindrical surface and are mounted on toroidal core 109. It is seen that coils 110 and 111 are not toroidally wound about core 109. Rather, these coils are wound in a manner similar to the coils of the prior art motors shown in FIGS. 1 and 2. Coil 110 is provided with a positive path 110a and a negative path 110b through which current flows in positive and negative directions, respectively, along conductors which are aligned in the axial direction. The embodiment of FIGS. 12 and 13 differs from the embodiments of FIGS. 3–11 in that the positive and negative paths of coil 110 are equally spaced from the magnetic pole pieces. Coil 111 is similar to coil 110 and includes a positive path 111a and a negative 111b, these positive and negative paths extending in the axial direction.

The positive and negative path portions of coil 110 are separated from each other by a circumferential dimension equal to about 120°. Similarly, the positive and negative paths of coil 111 are separated from each other by a circumferential dimension equal to 120°. That is, the angle defined by the positive and negative paths of a respective coil is equal to 120°. Coils 110 and 111 are diametrically opposed to each other, or separated by 180°.

Position sensing element 115 and coil energizing circuit 114 are provided on circuit board 112, similar to the construction shown in FIG. 3. In one embodiment, position sensing element 115 is a Hall effect device, and an annular magnetic member 118 is provided on rotor 101 in facing relation to this Hall effect device. Annular magnet 118 preferably is magnetized in its thickness direction so as to provide north and south poles each extending over a positional angle of 180°. Thus, the rotation of annular magnet 118 past Hall effect device 115 results in the generation of positional signals by the Hall effect device corresponding to the angular position of rotor 101; these angular position signals being used by circuit 114 to selectively energize coils 110 and 111, in a manner soon to be described.

Figure 14A:
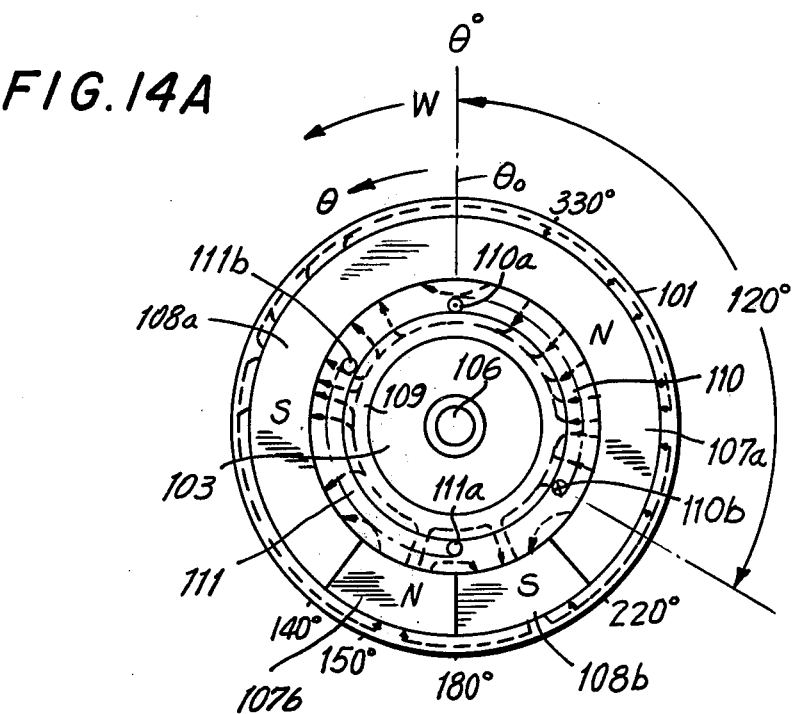
Figure 14B:
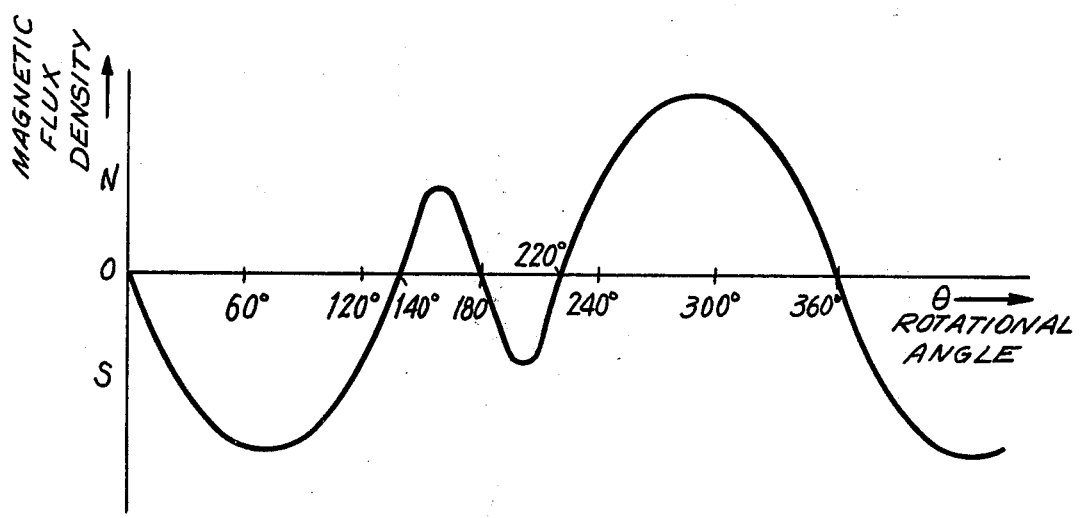

The motor shown in FIGS. 12 and 13 is redrawn in FIG. 14A and coils 110 and 111 each are represented by a single turn. A magnetic circuit is provided from north pole piece 107a to core 109, and then to south pole piece 108a and the cup-shaped yoke of rotor 101. Another magnetic circuit, or path, extends from north pole piece 107a to core 109 and then to auxiliary south pole piece 108b to the cup-shaped yoke. Yet another magnetic circuit extends from auxiliary north pole piece 107b to core 109 and then to south pole piece 108a and the cup-shaped yoke. Finally, a further magnetic circuit extends from auxiliary north pole piece 107b to core 109 and then to auxiliary south pole piece 108b and the cup-shaped yoke. These magnetic circuits are represented by the broken lines shown in FIG. 14A. The magnetic flux distribution in a rotary path about the axis of the motor is as shown in FIG. 14B. The magnetic flux of south polarity extending from 0° to 140° is due to south pole piece 108a; the magnetic flux of north polarity extending from 140° to 180° is due to auxiliary north pole piece 107b; the magnetic flux of south polarity extending from 180° to 220° is due to auxiliary south pole piece 108b; and the magnetic flux of north polarity extending from 220° to 360° is due to north pole piece 107a. Hence, the magnetic flux is seen to exhibit a sinusoidal distribution from 0° to 140°, another sinusoidal distribution from 140° to 220°, and the first-mentioned sinusoidal distribution from 220° to 360°.

If it is assumed that coil 110 is energized for a complete 360° rotation, then the rotational torque generated by the magnetic flux distribution shown in FIG. 14B linking positive path 110a appears as shown by curve a in FIG. 14C. This rotational torque is seen to have substantially the same waveform as the magnetic flux distribution shown in FIG. 14B. Now, when positive current flows through positive path 110a, negative current flows through negative path 110b of coil 110. If negative path 110b is assumed to occupy the same position which is illustratively occupied by positive path 110a, then the rotational torque generated by the magnetic flux which links this negative path portion would be as shown by curve b' in FIG. 14C. It is appreciated that curve b' is the negative, or inverted version of curve a, as is expected from the negative current flowing through negative path 110b. However, in actuality, negative path 110b is angularly displaced, or phase delayed, by 120° from positive path 110a. Thus, curve b' in FIG. 14C should be phase delayed by 120°. Such a phase delayed curve is shown as curve b, which represents the torque which is generated as a result of the magnetic flux linking with negative path 110b. Of course, the total torque which is generated is equal to the sum of curves a and b. That is, the total torque is equal to the sum of the component which is due to the linking of the magnetic flux with positive path 110a and the component due to the linking of the flux with negative path 110b. When curves a and b are added, the resultant, overall torque is as shown by the solid curve A in FIG. 14C.

It is seen that the overall torque, represented by curve A, is positive over a rotational angle greater than 180°. In particular, this positive torque extends from about 132° to about 352°, for an angle of about 220°. It is appreciated that if coil 110 is energized within this 220° range of positive torque, then rotor 101 will be rotated in the direction W (FIG. 14A). In accordance with this invention, coil 110 is energized for a duration equal to 180 electrical degrees within this range of 220°, and then coil 111 is energized for a duration equal to 180 electrical degrees. For example, if coil 110 is energized from angular position $\theta_1$ to angular position $\theta_2$, then when positive path 110a reaches angular position $\theta_2$, positive path 111a of coil 111 reaches angular position $\theta_1$. At that time, coil 110 should be de-energized and coil 111 should be energized. As a typical example, angular position $\theta_1$ is equal to a rotational angle of 150° which, it is seen from FIG. 14A, extends by 10° into the magnetic flux of north polarity generated by auxiliary north pole piece 107b. Of course, the period of energization of coil 110 and then coil 111 extends from 150° to 330°, the latter angular position corresponding to $\theta_2$. Accordingly, if coil 110 is energized from the time that positive path 110a reaches the angular position of 150°, with the angular position of 0° being referenced at the boundary between the main north and south pole pieces 107a, 108a, then coil 110 is de-energized when positive path 110a reaches angular position 330° and positive path 111a of coil 111 reaches angular position 150°. Coil 111 then is energized from the time that its positive path 111a reaches angular position 150° until this positive path reaches angular position 330°. At that time, coil 111 is de-energized and coil 110 is energized once again. The resultant overall torque which is generated in accordance with this selective energization of coils 110 and 111 is shown in FIG. 14D. The angular positions indicated in FIG. 14D are the angular positions occupied by coil 110. Hence, coil 111, designated as the "B-phase", is energized for a duration of 180° from the time that positive path 110a of coil 110 is at 330° until this positive path of coil 110 is at 150°. At that time, coil 111 is de-energized, and coil 110, shown as the "A-phase" is energized for a duration of 180 electrical degrees. It is appreciated that the overall rotational torque is not reduced to zero at any point during the rotation of rotor 101.

Drive circuit 114, which may be similar to the drive circuit shown in FIG. 7A, selectively energizes coil 110 and coil 111 with energizing current having the waveforms shown in FIG. 14E. Preferably, each coil is energized for a duration of 180°. However, satisfactory operation of the illustrated motor does not require that the coils be energized only for these equal angular durations. For example, coil 110, that is, the A-phase, may be energized over an angular range of 190°, and coil 111, the B-phase, may be energized over the angular range of 170°.

Annular magnet 118, which is used in conjunction with position sensing element 115 to detect when rotor 101 rotates to the angular position $\theta_1 = 150°$ is shown by the broken lines in FIG. 13. As illustrated therein, a north-south boundary of annular magnet 118 is positioned at 150° with respect to the 0° reference formed by the boundary between the main north and south pole pieces 107a, 108a. Hence, when this boundary in annular magnet 118 is detected by position sensing element 115, a suitable change-over signal is supplied to the coil driving circuits so as to change over, or switch, the energization of these coils, whereby coil 111 is de-energized and coil 110 is energized. Annular magnet 118 is provided with another north-south boundary at 180° from the first-mentioned north-south boundary. This other north-south boundary is seen to be provided at 330° with respect to the 0° reference position of the main north and south pole pieces. Hence, when position sensing element 115 senses this other north-south boundary, another change-over signal is produced so as to switch the energization of the coils, whereby coil 110 now is de-energized and coil 111 is energized. Thus, the cooperation of annular magnet 118 and position sensing element 115 results in the current change-over signals shown in FIG. 14E, whereby coils 110 and 111 are alternately energized.

The circumferential dimension of each of the main north and south pole pieces is less than 180°, and shown in FIGS. 12–14 as 140°. The angular spacing between the positive and negative paths of each coil 110, 111 is less than the circumferential dimension of each main pole piece, and has been described herein as being equal to about 120°. However, as is apparent from torque derivation curves a and b, the positive and negative paths of each coil may be separated from each other by less than 120°. Furthermore, although the magnetic flux distribution generated by the main and auxiliary pole pieces exhibits sinusoidal waveform components, as shown in FIG. 14B, the flux distribution attributed to the main north pole piece 107a (or to the main south pole piece 108a) may be of a trapezoidal form, such as shown previously in FIG. 6A. Similarly, the magnetic flux distribution due to auxiliary pole pieces 107a and 108b may be of reduced magnitude. If the magnetic flux density over the angular range from 140° to 220° is thus reduced, such as shown by curve a in FIG. 15, then the resultant, overall rotational torque appears as shown by curve A in FIG. 15. In this figure, curve A is derived by summing the components of torque due to the magnetic flux linking the positive path of the energized coil (this component being shown as curve a) and the component produced by the magnetic flux linking the negative path of the coil (this component being shown by curve b). Curve A of FIG. 15 is seen to resemble curve A of FIG. 14C, except that the ripple of FIG. 14C is substantially reduced. Here again, coils 110 and 111 are alternately energized such that the torque generated as a result of the energization of each coil is substantially the same. This torque is represented as the section S of coil A between angular positions $\theta_1$ and $\theta_2$. That is, when positive path 110a of coil 110 reaches angular position $\theta_1 = 150°$, coil 110 is energized and remains energized until positive path 110a reaches angular position $\theta_2 = 330°$. At that time, coil 110 is de-energized and coil 111 is energized for an angular duration of about 180°. Thus, with the energization of coil 111, a torque substantially similar to section S of curve A in FIG. 15 is generated.

In view of the distribution of magnetic flux generated by the main and auxiliary pole pieces, as shown in FIG. 14B, it is appreciated that the auxiliary pole pieces are not considered in calculating the number of pairs of poles. Thus, in the embodiments shown in FIGS. 12–14, even though four separate magnetic pole pieces are provided, the motor is a 2-pole motor consisting of only two main poles.

Another embodiment of this invention is shown in FIG. 16A wherein north pole piece 107 and south pole piece 108 define one boundary therebetween and wherein an air gap 130 is provided between the other ends of these pole pieces. As before, each of the north and south pole pieces has a circumferential dimension of 140°. Hence, air gap 130 is provided for a circumferential dimension of 80°. The total circumferential dimension of north pole piece 107, south pole piece 108 and air gap 130 is equal to 360°. Thus, it is seen that auxiliary pole pieces 107b and 108b, shown in FIGS. 13 and 14, are omitted. In addition, the positive and negative paths of each coil 110, 111 are separated from each other by 100°. This differs from the embodiment of FIGS. 13 and 14 wherein the positive and negative paths of a coil are separated by 120°.

Figure 16B:
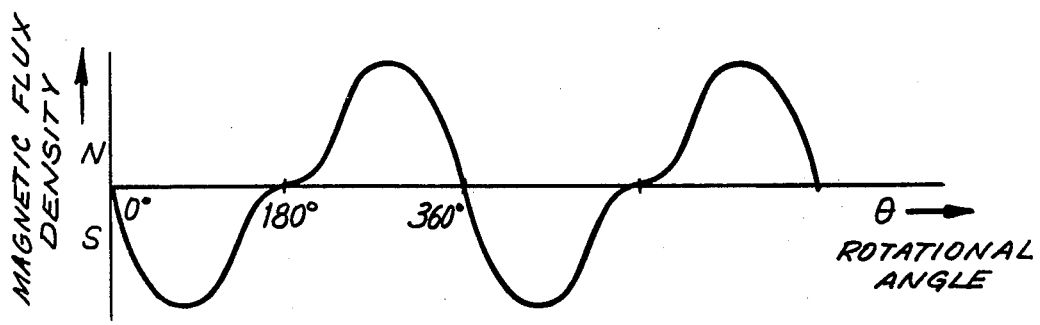
FIGS. 16 A,B,C and D; 17A and B; 18A and B; 19A and B 20A and B; 21A and B; 22A and B; 23A and B; 24A, B and C represent various modifications of this embodiment of the DC motor.

Referring to FIG. 16B, it is seen that the magnetic flux density linking coils 110, 111 in the vicinity of air gap 130 is substantially reduced relative to the remaining flux density. This, of course, is because no flux is generated by the air gap. The component of rotational torque due to the magnetic flux distribution shown in FIG. 16B linking positive path 110a of coil 110 appears as shown by curve a in FIG. 16C. The component of rotational torque due to the magnetic flux distribution linking negative path 110b, which is phase delayed by 100° from positive path 110a, is as shown by curve b in FIG. 16C. The resultant, overall torque generated by the magnetic flux linking coil 110 is as shown by curve A. As is recognized, a similar rotational torque is generated as a result of the magnetic flux distribution linking coil 111.

Figure 16C:
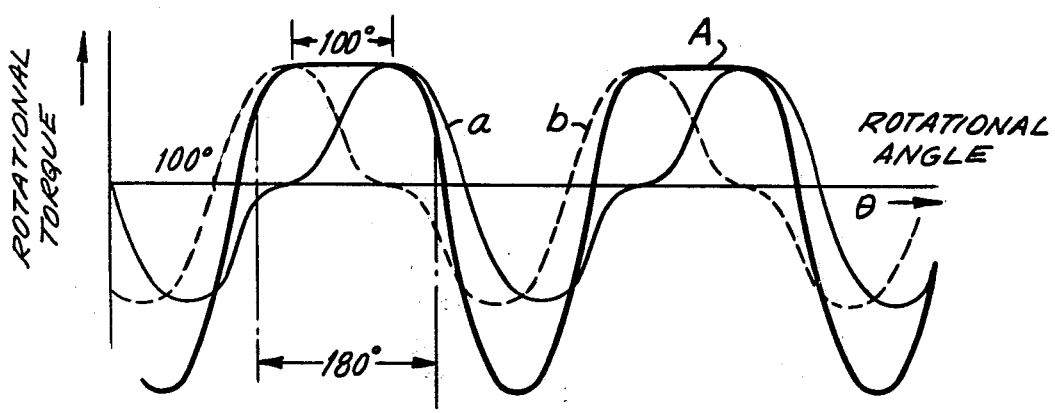
Figure 16D:
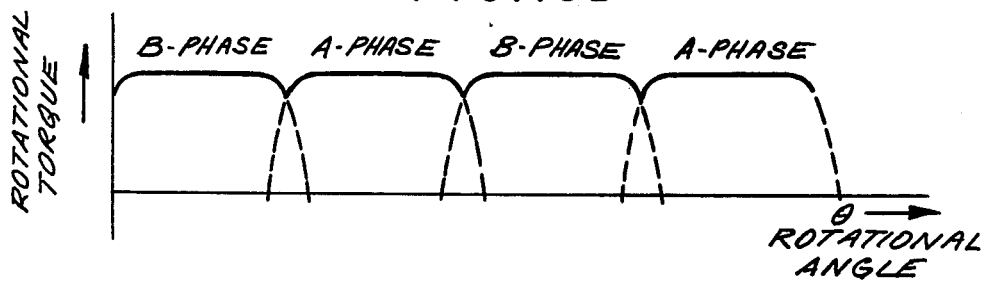

It is appreciated that the rotational torque which would be generated if a coil is energized for 360° is positive for an angular range which is greater than 180°. Thus, if coils 110 and 111 are energized alternately, and each for a duration of about 180°, then positive torque that does not return to zero is generated for a rotational angle of 360°. FIG. 16D is a waveform representation of this positive torque—the curve identified as the A-phase curve is the torque generated by energizing coil 110 for a duration of 180°, and the curve identified as the B-phase curve is the torque which is generated when coil 111 is energized for a duration of 180°.

By providing air gap 130, it is seen that the overall torque shown in FIG. 16D exhibits even less ripple than the overall torque which is shown in FIGS. 14D and 15.

Coils 110 and 111 may be energized with a circuit of the type shown in FIG. 7A using a position sensing element and annular magnet, such as element 115 and magnet 118 shown in FIGS. 12 and 13. In FIG. 16C, coil 110 may be energized from the time that its positive path reaches the angular position of 150° until its positive path reaches the angular position of 330°. A similar, alternate energization of coil 111 then ensues.

Figure 17B:
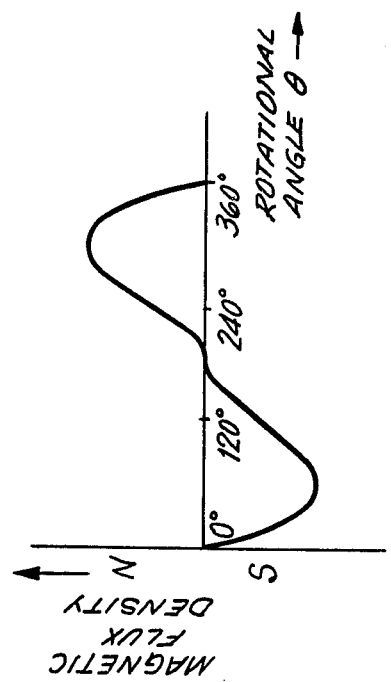
Figure 17A:
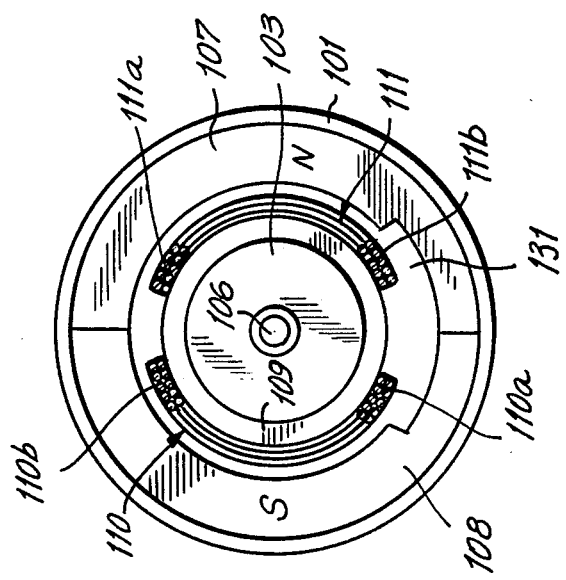

Another modification of this invention is shown in FIG. 17A wherein north pole piece 107 and south pole piece 108 each exhibit a circumferential dimension of 180°. However, a cut-out portion 131 is provided in the surface of the pole pieces facing coils 110 and 111. This cut-out portion may have an arcuate extent of about 80°, and is comparable to air gap 130 shown in FIG. 16A. As a result of this cut-out portion, the magnetic flux density linking coils 110, 111 in the vicinity thereof is relatively low. The resultant magnetic flux distribution in a rotary path extending about the axis of the motor is shown in FIG. 17B. It is seen that cut-out portion 131 has the same effect upon the magnetic flux distribution (shown in FIG. 17B) as does air gap 130 (having the magnetic flux distribution shown in FIG. 16B). Accordingly, in the embodiment shown in FIG. 17A, the resultant, overall torque is positive over a range which is greater than 180°, as shown in FIG. 16C. Therefore, by alternately energizing coils 110 and 111 for approximately 180° durations, a torque having the waveform shown in FIG. 16D is imparted to rotor 101. That is, the torque which is generated by the embodiment shown in FIG. 17A is quite similar to the torque which is generated by the embodiment shown in FIG. 16A.

In the embodiment of FIG. 16A, and in the embodiment of FIG. 17A, air gap 130 and cut-out portion 131, respectively, may be filled with non-magnetic material having relatively low magnetic susceptibility. Nevertheless, this will not materially disturb the magnetic flux distribution shown in FIGS. 16B and 17B, respectively.

Yet another modification of this invention is shown in FIG. 18A wherein a 4-pole brushless motor is illustrated. One pair of pole pieces is constituted by north pole piece 107a and south pole piece 108a, separated by an air gap 130a therebetween. The other pair of poles is constituted by north pole piece 107b and south pole piece 108b separated by an air gap 130b therebetween. The respective pairs of poles are symmetrical with respect to each other and extend about positional angles each equal to 180°. The coils are constituted by coils $110_A$ and $110_B$ forming one phase, and coils $111_A$ and $111_B$ forming the other phase. Coils $110_A$ and $110_B$ are diametrically opposed with respect to each other, as are coils $111_A$ and $111_B$.

The circumferential dimensions and angular separations of the respective elements shown in FIG. 18A may be electrically equal to the circumferential dimensions and angular separations shown in FIG. 16A. Since two poles are provided in the embodiment of FIG. 18A, it is seen that the electrical angle is equal to twice the positional angle therein. Because of the two symmetrical air gaps 130a and 130b, the rotation of rotor 101 in the embodiment of FIG. 18A is more uniform than the rotation of rotor 101 in the embodiment of FIG. 16A.

A modification of the embodiment shown in FIG. 18A is illustrated in FIG. 18B. In this modified embodiment, three pairs of poles are provided, and two phases of coils also are provided. Thus, one pair of poles is constituted by north pole piece 107a and south pole piece 108a separated by air gap 130a. Another pair of poles is constituted by north pole piece 107b and south pole piece 108b separated by air gap 130b. The third pair of poles is constituted by north pole piece 107c and south pole piece 108c separated by air gap 130c. The pairs are symmetrical with respect to the axis of the motor, and north and south pole pieces are seen to alternate circumferentially. One phase is constituted by coils $110_A$, $110_B$ and $110_C$, and the other phase is constituted by coils $111_A$, $111_B$ and $111_C$. These coils are seen to be arranged symmetrically with respect to the motor axis and a coil of one phase alternates with a similar coil of the other phase. Because of the symmetry provided by the three pairs of poles, the respective air gaps and the phases of coils, the rotation of rotor 101 in the embodiment of FIG. 18B is more uniform than the rotation of the rotor in the embodiment of FIG. 16A.

Referring now to FIG. 19A, yet another embodiment of the present invention is illustrated. In this embodiment, north pole piece 107 and south pole piece 108 each exhibit a circumferential dimension of 180°. However, the cup-shaped yoke of rotor 101 is provided with a cut-out portion 132 which extends over an angle of about 80°. Whereas the cup-shaped yoke is included as part of the magnetic circuit whereby magnetic flux links coils 110 and 111, cut-out portion 132 removes a portion of this magnetic circuit. Hence, the magnetic flux which links the coils in the vicinity of this cut-out portion is of reduced density. Thus, the magnetic flux distribution in a rotary path about the motor axis has the waveform shown in FIG. 19B. It is appreciated that this waveform is quite similar to the waveform shown in FIG. 16B. Hence, the overall torque which is generated by the magnetic flux linking coils 110 and 111 is as shown in FIGS. 16C and 16D. In the embodiment of FIG. 19A, it is contemplated that coils 110 and 111 are alternately energized for substantially equal durations of about 180°. If desired, cut-out portion 132 of the cup-shaped yoke may be filled with non-magnetic material.

Yet another embodiment of this invention is illustrated in FIG. 20A wherein north pole piece 107 and south pole piece 108 each exhibits a circumferential dimension of 180°. However, in this embodiment, a cut-out portion is provided in the north and south pole pieces, and a magnetic shield plate 133 is fixed in this cut-out portion. The arcuate extent of this ferromagnetic shield plate may be an angle equal to the arcuate extent of cut-out portion 131 shown in FIG. 17A. Alternatively, shield plate 133 may extend over a larger arc.

As shown by the broken lines in FIG. 20A, shield plate 133 functions as a magnetic short circuit to prevent a portion of the magnetic flux generated by the north and south pole pieces in the vicinity of this shield plate from reaching coils 110 and 111. Consequently, in the air gap between shield plate 133 and core 109, the magnetic flux density is substantially reduced. That is, coils 110 and 111, in the vicinity of shield plate 133, are shielded from magnetic flux. As a consequence thereof, the magnetic flux density in a rotational path about the motor axis has the waveform shown in FIG. 20B. It is seen that the magnetic flux is reduced to about zero in the angular range defined by shield plate 133. This magnetic flux distribution is similar to the magnetic flux distribution shown in FIG. 16B. Hence, the overall torque imparted to rotor 101 in accordance with the embodiment shown in FIG. 20A has the waveform shown in FIG. 16D.

FIG. 21A illustrates yet another embodiment of this invention wherein north pole piece 107 and south pole piece 108 extend for less than 180°. These pole pieces define a boundary at, for example, a 0° reference position, and a yoke 134 formed of ferromagnetic material is positioned in the gap between the other ends of the pole pieces. Yoke 134 is seen to fill air gap 130 described previously with respect to FIG. 16A. Hence, north pole piece 107 and south pole piece 108 each may exhibit a circumferential dimension of 140°, and yoke 134 may have an arcuate angle of about 80°.

The magnetic path through yoke 134 from the north and south pole pieces is shown by the broken lines in FIG. 21A. Hence, this yoke modifies the magnetic flux distribution linking coils 110 and 111 in the vicinity thereof. This flux distribution along a rotary path of the motor axis has a waveform of the type shown in FIG. 21B. This magnetic flux distribution is similar to that shown in FIG. 14B, and is even more similar to the embodiment described with respect to FIG. 15. Hence, the overall torque which is imparted to rotor 101 in the embodiment of FIG. 21A is as shown by curves A in FIGS. 14C and 15. Thus, if coils 110 and 111 are alternately energized, the overall torque is not reduced to zero at any point along a rotation of 360°, and the ripple exhibited by this torque is relatively small.

A still further embodiment is shown in FIG. 22A. This embodiment is similar to the embodiment described with respect to FIGS. 12-14, except that auxiliary north pole piece 107b in the earlier-described embodiment now is formed of a pair of auxiliary north pole pieces 107b and 107c, and the auxiliary south pole piece 108b in the earlier-described embodiment now is replaced by a pair of auxiliary south pole pieces 108b and 108c. The remainder of the motor construction shown in FIG. 22A is substantially similar to the previously described embodiment. However, the positive and negative paths of each coil 110, 111 in FIG. 22A may be spaced apart by less than 120°, for example, by 100°.

As a result of the alternately arranged auxiliary pole pieces 107b, 108c, 107c and 108b, the magnetic flux distribution in a rotary path about the axis of the motor appears as shown in FIG. 22B. It is seen that magnetic flux of south polarity is separated from magnetic flux of north polarity by north and south polarity ripples which are attributed to the respective auxiliary pole pieces which are disposed between the main pole pieces. Of course, in the embodiment of FIG. 22A, as in the embodiments of FIGS. 12-14, the main north pole is adjacent an auxiliary south pole and the main south pole is adjacent an auxiliary north pole. Although not shown herein, it may be recognized that the overall torque which is imparted to rotor 101 in the embodiment shown in FIG. 22A is similar to the overall rotational torque shown in FIG. 14D, except that additional ripple components are provided between the positive peaks, although these additional ripple components are of reduced magnitude.

In the embodiment of FIG. 22A, still additional auxiliary pole pieces can be provided between the main north and south pole pieces. Still further, the centrally disposed auxiliary pole pieces 107c and 108c can be omitted, if desired. The resultant air gap formed by removing these auxiliary pole pieces results in a magnetic flux distribution in the vicinity of this air gap having the waveform represented by the broken line shown in FIG. 22B. Thus, additional ripples due to auxiliary pole pieces 107c and 108c will be avoided. Still further, the air gap formed by removing these auxiliary pole pieces can be filled by a ferromagnetic material.

In the embodiment shown in FIG. 22A, as well as in the described modifications thereof, the overall rotational torque remains positive over an angle of 360°, and is not reduced to zero at any point thereover.

Figure 23A:
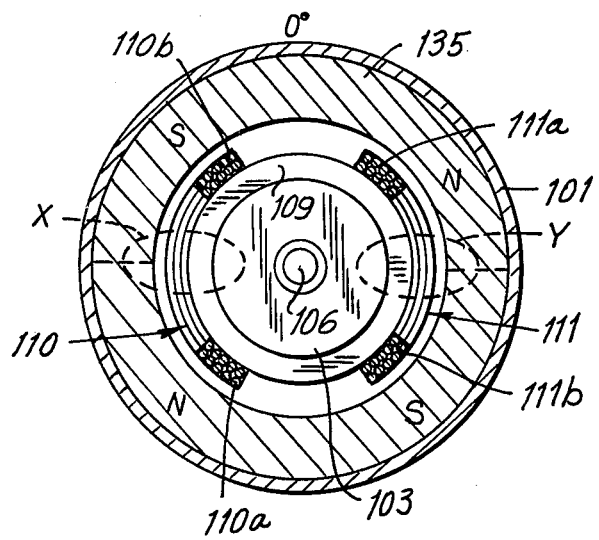

FIG. 23A illustrates yet another modification of the present invention wherein the magnetic pole pieces included in rotor 101 are formed as a single cylindrical anisotropic magnet 135. This anisotropic magnet is surrounded by the cup-shaped yoke, and is magnetized so as to have four poles. Magnetic domains are provided at the 0° reference position and at a positional angle of 180°. A substantially continuous transition in the magnetic flux from north polarity to south polarity is provided at the 0° and 180° magnetic domains.

Figure 23B:
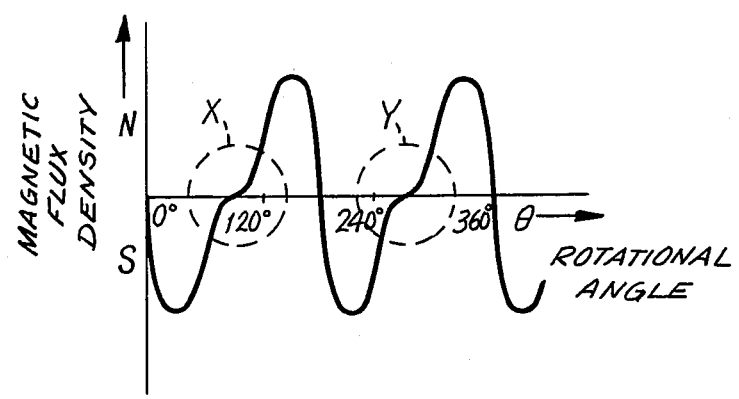

In regions X and Y, that is, at positional angles 90° and 270°, the magnetic flux density due to anisotropic magnet 135 is reduced. The resultant magnetic flux distribution in a rotary path about the motor axis appears as shown in FIG. 23B, with the reduced magnetic flux density in regions X and Y of FIG. 23A being identified in FIG. 23B. In view of the four poles which are provided by anisotropic magnet 135, one complete cycle of the magnetic flux distribution, or 360 electrical degrees, is provided in a rotational angle of 180°. Hence, as rotor 101 makes one complete rotation, the magnetic flux linking a reference position on coil 110 or coil 111 appears as shown in FIG. 23B.

The reduced flux density at regions X and Y is similar to the reduced flux density shown in FIG. 16B. Hence, the overall rotational torque imparted to rotor 101 is substantially similar to the waveform shown in FIG. 16D.

It may be recognized that the magnetic flux distribution shown in FIG. 23B can be obtained by varying the intensity of magnetization of anisotropic magnet 135 at regions X and Y. The use of an anisotropic magnet is particularly advantageous for a 4-pole alternate phase DC motor. Although FIG. 23A shows two separate coils 110 and 111, each coil can be formed of a pair of series-connected coils, such as described previously with respect to FIG. 18A.

In the embodiment shown in FIGS. 12-22, the angular extent, or circumferential dimension, of the auxiliary pole pieces, air gaps, cut-out portions, shield plates and yokes are less than 180°. As examples, these elements have been shown to be about 80 electrical degrees; but other circumferential dimensions, or arcuate lenghts can be used, as desired.

The angular separation, or distance, between the positive and negative paths of each coil has been shown to be less than 180° in the embodiments of FIGS. 12-23. As numerical examples, these angular separations have been described as 120° or 100° in specific embodiments. This angular separation may be represented as the electrical angle $\alpha$. A positional angle $\alpha'$ corresponds to the electrical angle $\alpha$. However, it is apparent that the positional angle which separates the positive and negative paths of a coil also may be represented by the supplemental angle $\beta$, wherein $\alpha' + \beta = 360°$. For example, and with reference to FIG. 24A, the angular separation $\alpha'$ between positive path 110a and negative path 110b of coil 110 is shown as 120°. However, coil 110 may be formed such that a single turn is constituted by a conductor segment parallel to the motor axis and comprises the positive path 110a, followed by another conductor segment forming an arc of 240°, followed by another conductor segment which is parallel to the motor axis and which comprises negative path 110b, and finally followed by yet another conductor segment which forms an arc of 240° and which connects path 110b and 110a. In that construction, the circumferential dimension of coil 110, shown by solid lines in FIG. 24A, that is, the angular separation between positive path 110a and negative path 110b is equal to 240°. A similar construction of coil 111, shown by the broken line in FIG. 24A, results in positive path 111a being separated from negative path 111b by the angular distance of 240°.

FIG. 24B is a perspective view of one turn of coil 110 wherein positive path 110a is separated from negative path 110b by the angular distance of 240°. It may be appreciated that when coils 110 and 111 both are provided, portions of both coils overlap with each other. That is, if coils 110 and 111 are symmetrically disposed with respect to each other, diametrically opposed portions of coil 110 will overlap with diametrically opposed portions of coil 111, each for an angular distance of 60°.

Further, the positive and negative paths of coil 110 (or coil 111) may be separated from each other by the electrical angle $360° \times m + \alpha$, wherein m is a positive integer. With this angular separation, a graphical representation of rotational torque generated by coil 110 (or coil 111) is similar to curves a and b of FIG. 16C, wherein these curves are shifted to the right by $360° \times m$. The resultant composite torque which is generated by the magnetic flux linking coil 110 thus would be similar to curve A of FIG. 16C.

In general, for an n-pole motor, the positional angle $\alpha'$ by which the positive and negative paths of coil 110 (or coil 111) are separated may be expressed as $$\alpha' = \frac{360° \times m + \alpha}{\frac{n}{2}}.$$

Thus, for the n-pole motor, the positional angular separation between the positive and negative paths of a coil may be expressed as $\alpha'$ or by the supplementary positional angle $\beta$ wherein $$\beta = 360° - \frac{360° \times m + \alpha}{\frac{n}{2}}$$

As an example of the foregoing equation, FIG. 24C represents a 4-pole motor. In this example, the electrical angle by which positive path 110a is separated from negative path 110b is assumed to be 100°, as in the embodiment shown in FIG. 16A. Furthermore, in this 4-pole motor, the coils are wound in two phases, wherein one phase is formed of coil $110_A$ and $110_B$, shown by the solid lines in FIG. 24C and being diametrically opposed to each other, and the other phase is formed of coil $111_A$ and coil $111_B$, being diametrically opposed to each other. All of the coils are symmetrically disposed about core 109. Using the foregoing equation for the position angle $\alpha'$, and with the assumption that m=1, then the positional angle $\alpha'$ between the positive and negative paths of coil $110_A$ may be expressed as $$\alpha' = \frac{360° + 100°}{\frac{4}{2}} = 230°$$

A similar positional angle $\alpha' = 230°$ separates the positive and negative paths of each of the remaining coils $110_B$, $111_A$ and $111_B$.

The positional angle by which the positive and negative paths of each coil are separated may be expressed as the supplemental angle $\beta$. That is, if positional angle $\alpha' = 230°$, then supplemental angle $\beta = 130°$. This positional angle $\beta$ corresponds to an electrical angular separation of 260° (since two pairs of poles are provided).

As also shown in FIG. 24C, coils $110_A$ and $110_B$ are separated from each other by a positional angle of 180°, which is equal to an electrical angle of 360°. Also, coil $110_A$ is angularly spaced from coil $111_A$ by the positional angle 90°, which is equal to the electrical angle 180°. A similar angular separation is provided between coil $110_A$ and coil $111_B$, between coil $110_B$ and coil $111_A$, and between coil $110_B$ and coil $111_B$.

Figure 25:
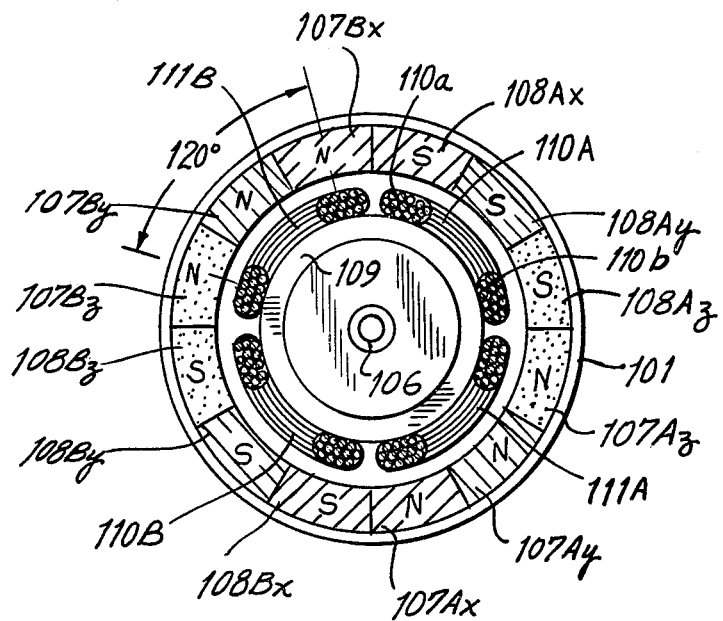
FIGS. 25–27 A,B,C and D represent yet another embodiment of a DC motor in accordance with the present invention.

Turning now to FIG. 25, there is illustrated another embodiment of the present invention formed of a 4-pole, 2-phase motor. The same reference numerals are used in FIG. 25 to identify the same component parts which have been identified previously. Accordingly, rotor 101 is seen to be formed of a cup-shaped yoke which circumscribes permanent magnet pole pieces, the rotor being an outer rotor. One pair of poles is formed of north pole piece $107_A$ and south pole piece $108_A$, while the other pair of poles is formed of north pole piece $107_B$ and south pole piece $108_B$. Each pole piece is formed of segmental pole pieces, here shown as three segments each, each segmental pole piece in a pole being formed of different magnetic material. Thus, north pole piece $107_A$ is formed of segments $107_{Ax}$, $107_{Ay}$ and $107_{Az}$. South pole piece $108_A$ is formed of segments $108_{Ax}$, $108_{Ay}$ and $108_{Az}$. North pole piece $107_B$ is formed of segments $107_{Bx}$, $107_{By}$ and $107_{Bz}$. Finally, south pole piece $108_B$ is formed of segments $108_{Bx}$, $108_{By}$ and $108_{Bz}$.

Segments $107_{Ax}$, $108_{Ax}$, $107_{Bx}$ and $108_{Bx}$ all are constituted of rare earth metals and, as will be shown below, exhibit the greatest magnetization. Segments $107_{Ay}$, $108_{Ay}$, $107_{By}$ and $108_{By}$ all are constituted of ferrite and exhibit an intermediate magnetization. Segments $107_{Az}$, $108_{Az}$, $107_{Bz}$ and $108_{Bz}$ all are constituted of a magnetic rubber material and exhibit the lowest magnetization. Each segmental pole piece extends over an arc of 30°. Commencing with pole piece $107_{Ax}$, and proceeding counterclockwise about the motor axis, the pole pieces are as follows: the north pole piece formed of rare earth metal, ferrite and magnetic rubber segments, the south pole piece formed of magnetic rubber, ferrite and rare earth metal segments, the north pole piece formed of rare earth metal, ferrite and magnetic rubber segments, and the south pole piece formed of magnetic rubber, ferrit and rare earth metal segments.

The coils are formed of two phases, one phase being comprised of coils $110_A$ and $110_B$, and the other phase being comprised of coils $111_A$ and $111_B$. The positive and negative paths of each coil are separated from each other by 120°. Furthermore, these phases are spaced from each other by 180 electrical degrees. That is, coil $110_A$ is spaced from coil $111_A$ by the positional angle of 90° which, since the motor is formed of two pairs of poles, is equal to an electrical angle of 180°. Coils $110_A$ and $110_B$ are connected in series and are diametrically opposed to each other, thus being spaced by 360 electrical degrees; and coils $111_A$ and $111_B$ likewise are connected in series and are spaced from each other by 360 electrical degrees.

Figure 26:
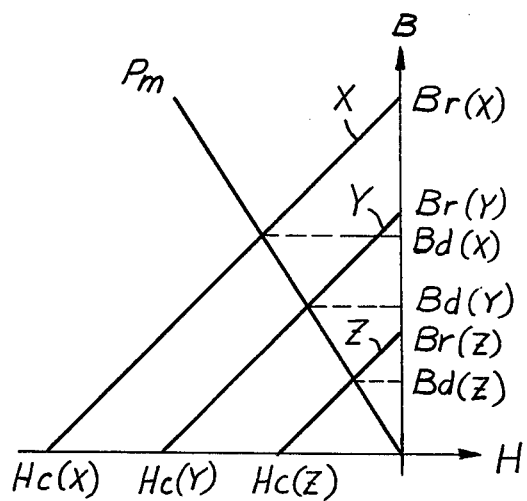

As mentioned above, the magnetization of the respective magnetic materials, that is, the rare earth metal, the ferrite and the magnetic rubber, differ from each other. FIG. 26 is a graphical representation of the demagnetizing curves for each of these magnetic materials. Each demagnetizing curve is illustrated in the second quadrant of the corresponding magnetization curve. The abscissa represents magnetic field intensity (H), and the ordinate represents magnetic flux (B). The intersection of each curve with the abscissa ($H_c$) represents the coercive force of the corresponding magnetic material, and the intersection of the demagnetizing curve with the ordinate ($B_r$) represents the residual magnetic flux density for that magnetic material. Curves X, Y and Z are the demagnetizing curves for rare earth metal, ferrite and magnetic rubber, respectively. As shown, the coercive force $H_c(X)$ of rare earth metal is greater than the coercive force $H_c(Y)$ of ferrite which, in turn, is greater than the coercive force $H_c(Z)$ of magnetic rubber. Similarly, the residual magnetic flux density $B_r(X)$ of rare earth metal is greater than the residual magnetic flux density $B_r(Y)$ of ferrite which, in turn, is greater than the residual magnetic flux density $B_r(Z)$ of magnetic rubber. If energy is represented as $B \times H$, then the energy of rare earth metal is greater than the energy of ferrite which, in turn, is greater than the energy of magnetic rubber.

The magnetic flux in the air gap between the pole pieces and core 109 is represented by an operating line $P_m$ drawn on the graph of FIG. 26. The magnetic flux densities in this air gap are found at the intersection of operating line $P_m$ with demagnetizing curves X, Y and Z. Thus, the linking magnetic flux densities due to the segmental pole pieces are expressed as $B_{d(X)}$, $B_{d(Y)}$ and $B_{d(Z)}$, wherein these linking magnetic flux densities are less than the corresponding residual magnetic flux densities, and wherein $B_{d(X)}$ is greater than $B_{d(Y)}$ which, in turn, is greater than $B_{d(Z)}$.

Figure 27A:
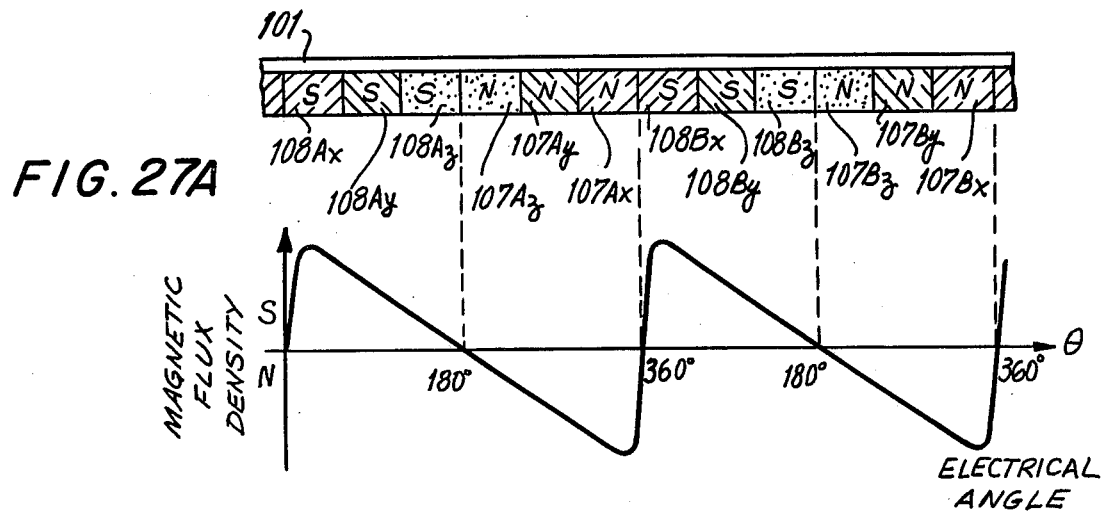

The rotor shown in FIG. 25 is illustrated in a developed view in FIG. 27A. The magnetic flux which is generated in a rotary path about the motor axis by the segmental pole pieces is shown as a sawtooth waveform. This flux decreases from a maximum of south polarity to zero at an electrical angle of 180°, and then increases to a maximum value of north polarity. At an electrical angle of 360°, the flux rapidly changes over from a maximum value of north polarity to a maximum value of south polarity. Then, the flux decreases to zero at an electrical angle of 180°, followed by an increase in flux of north polarity. At the next electrical angle of 360°, the polarity of the flux changes over once again. Although the magnetic flux density $B_{d(X)}$, $B_{d(Y)}$ and $B_{d(Z)}$ differ in a step-wise manner, the magnetic flux distribution shown in FIG. 27A is seen to vary substantially linearly from a maximum south polarity to a maximum north polarity. This linear variation, as opposed to a staircase type of variation, is due to the interaction of the magnetic flux generated by each segmental pole piece. Thus, the step-wise changes in flux are averaged over the rotary path about the motor axis.

It is appreciated that the sawtooth flux distribution shown in FIG. 27A is due to the variation in magnetic flux intensity generated by each segmental pole piece. Rather than forming the respective pole pieces of different magnetic material, each segmental piece can be formed of the same magnetic material, but the intensity of the flux generated by each such segmental piece can vary. The various means described hereinabove for varying the magnetic flux intensity can be used with such segmental pole pieces.

Figure 27B:
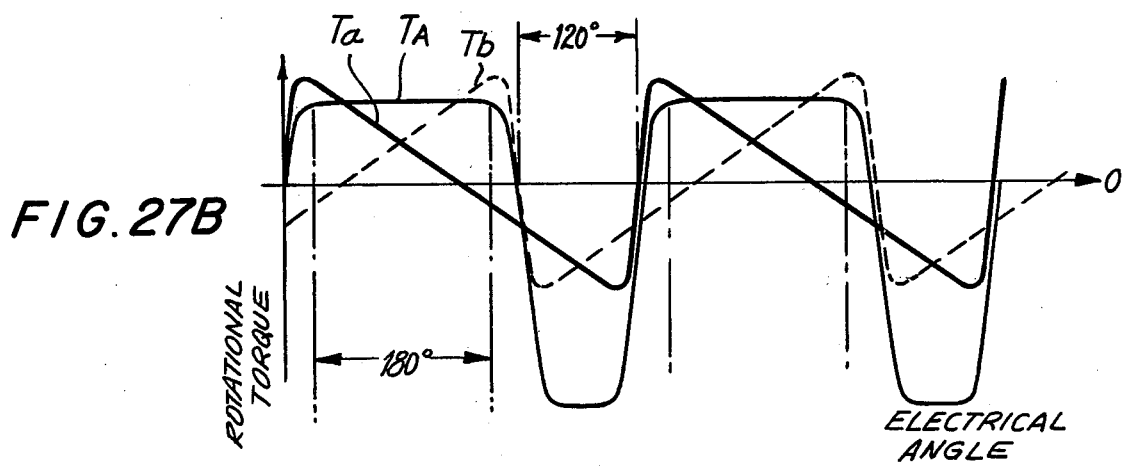

The component of torque $T_a$ which is generated by the magnetic flux which links positive path $110_a$ of coil $110_A$ when coil $110_A$ is energized is shown in FIG. 27B. When coil $110_A$ is energized, negative current flows through negative path $110_b$ of this coil. The component of torque $T_b$ which is generated by the flux which links this negative path is shown by the broken curve in FIG. 27B. The composite overall torque which is produced if coil $110_A$ is energized for a 360° degree rotation is shown as curve $T_A$. It is seen that torque $T_A$ is positive over a range which is greater than 180 electrical degrees. A similar torque, shifted by 180 electrical degrees, is generated when, for example, coil $111_A$ is energized. This torque, produced by coil $111_A$, may be represented as $T_B$. Since coil $110_B$ is displaced by 360 electrical degrees from coil $110_A$, a similar torque $T_A$ is produced when coil $110_B$ is energized. Likewise, since coil $111_B$ is displaced by 360 electrical degrees from coil $111_A$, torque $T_B$ is produced when coil $111_B$ is energized.

Figure 27C:
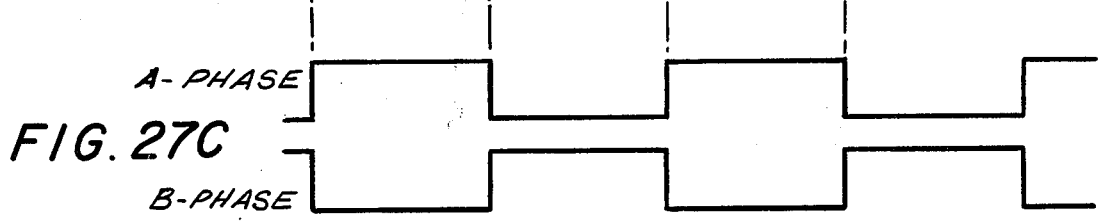

A position sensing element, such as element 115, described above, may be provided to sense when coil $110_A$ and then when coil $111_A$ reaches a predetermined angular position. At that time, the position sensing element triggers a current change-over circuit to energize coils $110_A$, $110_B$ and then coils $111_A$, $111_B$, respectively. The energizing currents flowing through coils $110_A$ and $110_B$ are represented as the A-phase currents and the energizing currents through coils $111_A$ and $111_B$ are designated the B-phase currents in FIG. 27C. Thus, coils $110_A$, $110_B$ are energized for a duration of 180° within the range that torque $T_A$ is positive, and then coils $111_A$, $111_B$ are energized for a duration of 180° within the range that torque $T_B$ is positive. As a result, a substantially constant composite torque is imparted to rotor 101 over a 360° rotation of the rotor, as shown in FIG. 27B. It is appreciated that the composite rotational torque exhibits negligible ripple.

Figure 27D:
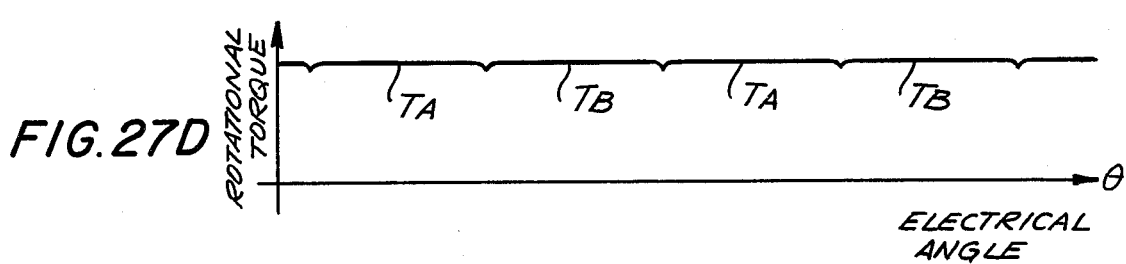
Figure 28:
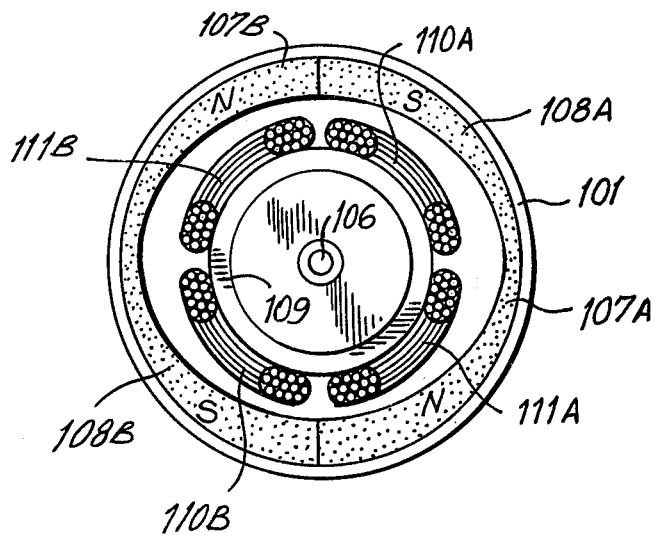
FIGS. 28–29A, B and C; 30A and B; 31A and B represent various modifications of this embodiment of the DC motor.

FIG. 28 shows a modification of the magnetic pole pieces which are formed of segmental pole pieces in FIG. 25. Thus, each of pole pieces $107_A$, $108_A$, $107_B$ and $108_B$ in FIG. 28 is formed of progressively changing thickness. This means that the air gap between a pole piece and core 109 progressively increases (or decreases). As a result of this change in the air gap, the flux density linking coils $110_A$, $110_B$, $111_A$ and $111_B$ has the waveform shown in FIG. 27A. That is, by changing the thickness of the respective pole pieces, the intensity of the magnetic flux generated thereby correspondingly changes. Hence, the composite rotational torque which is produced by the embodiment shown in FIG. 28 is similar to the composite torque whose waveform is shown in FIG. 27D.

Although each pole piece shown in FIG. 28 has gradually varying thickness, the thickness of a pole piece, such as each south pole piece, may be formed of segmental elements which differ in a step-wise manner from each other in thickness. Each such segmental pole piece of different thickness may extend over an arc of 30°. Still other techniques can be used, some of which having been described above, for varying the flux intensity generated by the respective pole pieces so as to form a magnetic flux distribution of sawtooth waveform, of the type illustrated in FIG. 27A.

Figure 29A:
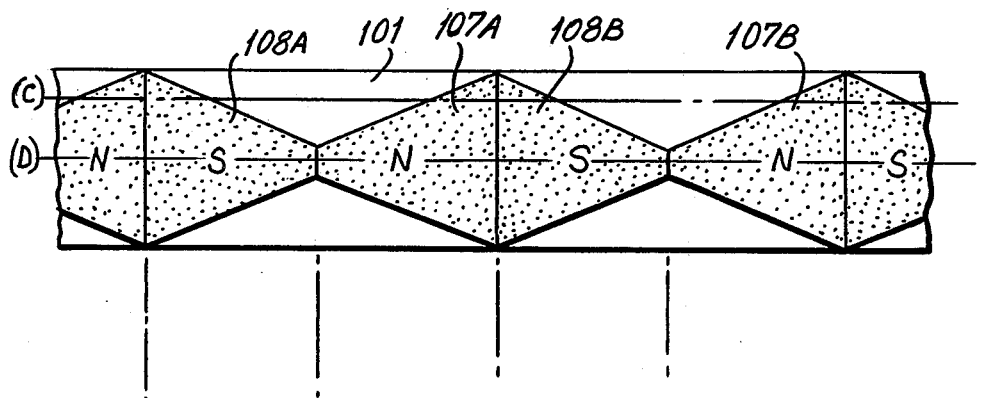
Figure 29B:
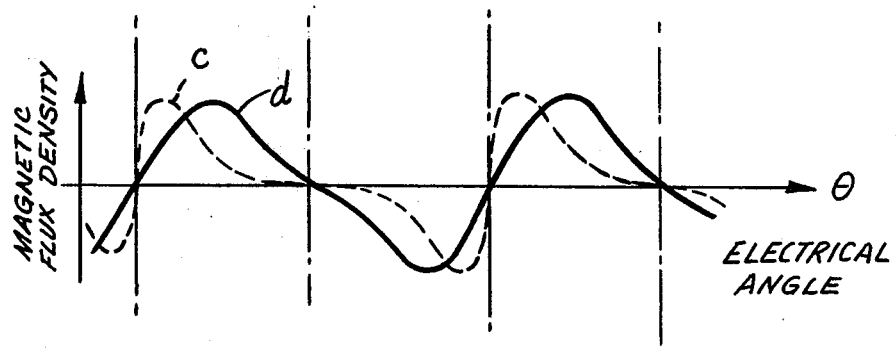
Figure 29C:
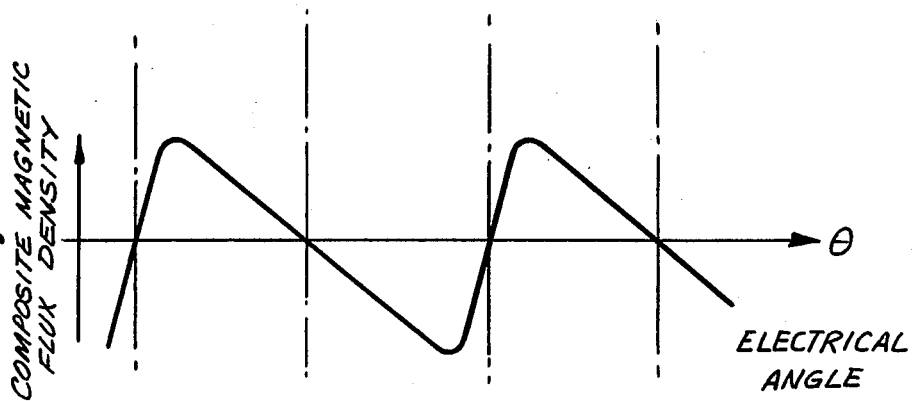
Figure 3I:
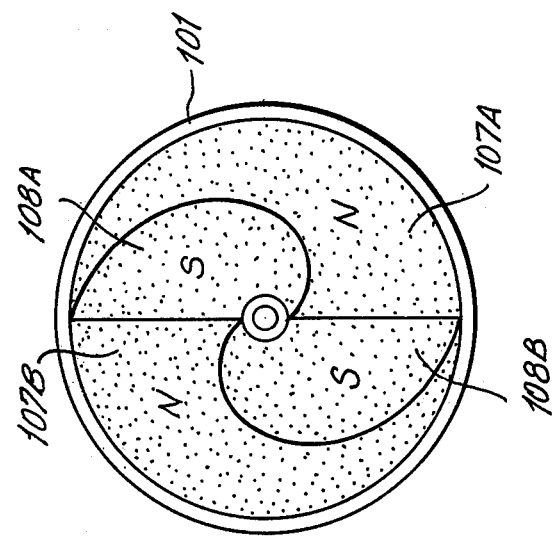
Figure 3I:
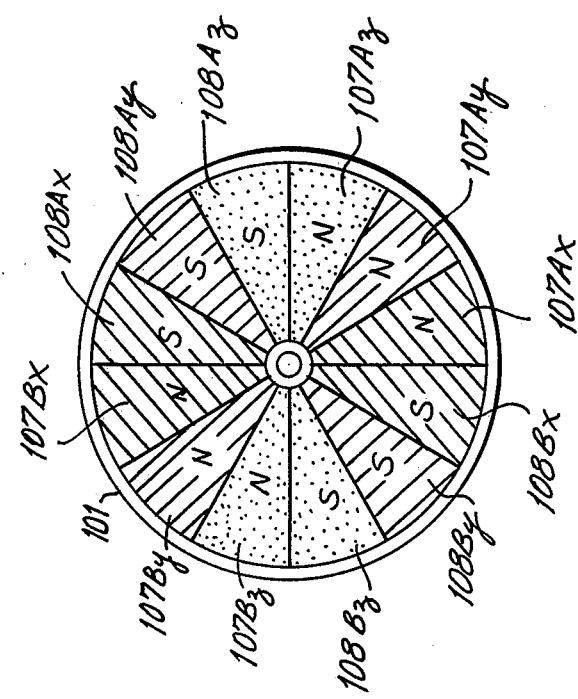

FIG. 29A is a developed view of yet another embodiment of the construction of the magnetic pole pieces which can be used in place of the segmental pole pieces illustrated in FIG. 25. Accordingly, each of the pole pieces $107_A$, $108_A$, $107_B$ and $108_B$ may have a trapezoidal shape. The shorter side of trapezoidal north pole piece $107_A$ is adjacent the shorter side of trapezoidal south pole piece $108_A$, and the longer side of trapezoidal north pole piece $107_A$ is adjacent the longer side of trapezoidal south pole piece $108_B$. Similarly, the shorter side of trapezoidal north pole piece $107_B$ is adjacent the shorter side of trapezoidal south pole piece $108_B$, and the longer side of trapezoidal north pole piece $107_B$ is adjacent the longer side of trapezoidal south pole piece $108_A$. Because of the configurations of the respective magnetic pole pieces shown in FIG. 29A, the waveshape of the magnetic flux distribution varies along different paths. For example, the magnetic flux distribution along path c in FIG. 29A appears as the broken curve c in FIG. 29B. The magnetic flux distribution along path d in FIG. 29A appears as shown by solid curve d in FIG. 29D. If the axis of the motor in which the magnetic pole pieces shown in FIG. 29A constitute the rotor is normal to paths c and d, the composite magnetic flux distribution which links the stator coils is proportional to the summation of the flux distribution shown as curves c and d in FIG. 29B. Hence, the composite magnetic flux distribution has the sawtooth waveform shown in FIG. 29C. Therefore, the composite rotational torque which is imparted to rotor 101 of FIG. 29A has the waveform shown in FIG. 27D.

Figure 30A:
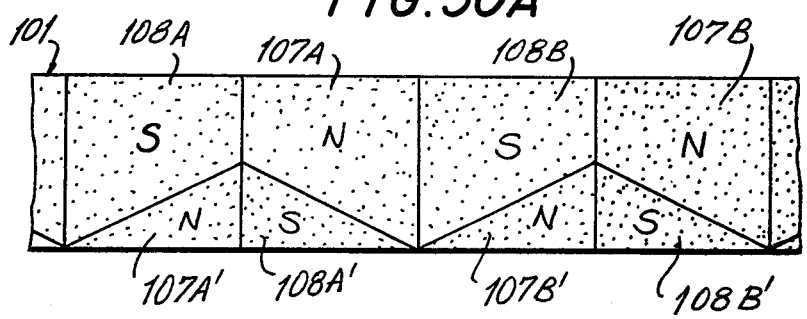

FIG. 30A illustrates yet another modification of the permanent magnet pole pieces which can be substituted for the pole pieces shown in FIG. 25. Accordingly, each of the north and south pole pieces $107_A$, $107_B$, $108_A$ and $108_B$ is trapezoidally shaped. Auxiliary pole pieces $107_A'$, $108_A'$, $107_B'$ and $108_B'$ are triangular. The longer vertical side of each trapezoidal pole piece is twice as long as the other vertical side thereof. As shown in FIG. 30A, the magnetic flux changes polarity at the shorter boundary between, for example, north pole piece $107_A$ and south pole piece $108_A$. Aligned with this boundary is the boundary formed between the triangular auxiliary pole pieces $107_A'$ and $108_A'$. The magnetic flux generated by these auxiliary pole pieces changes polarity in the opposite direction. Hence, at the boundary between north pole piece $107_A$ and south pole piece $108_A$, the magnetic flux is reduced substantially to zero. At the boundary between north pole piece $107_A$ and south pole piece $108_B$, magnetic flux of maximum north polarity changes over to a magnetic flux of maximum south polarity. Then, at the boundary between south pole piece $108_B$ and north pole piece $107_B$, the magnetic flux is reduced substantially to zero. Hence, the waveform of the magnetic flux distribution due to the pole structure shown in FIG. 30A appears as a sawtooth waveform of the type shown in FIG. 27A. Consequently, the composite rotational torque which is imparted to rotor 101 has the waveform shown in FIG. 27D.

At the upper or lower edge of rotor 101 shown in FIG. 30A, the polarity of the magnetic flux is seen to change at intervals equal to 180 electrical degrees. Hence, a Hall-effect device can be used as a position-sensing element to detect such flux polarity changes and thus can be used to control the energizing current change-over operation for the stator coils.

Figure 30B:
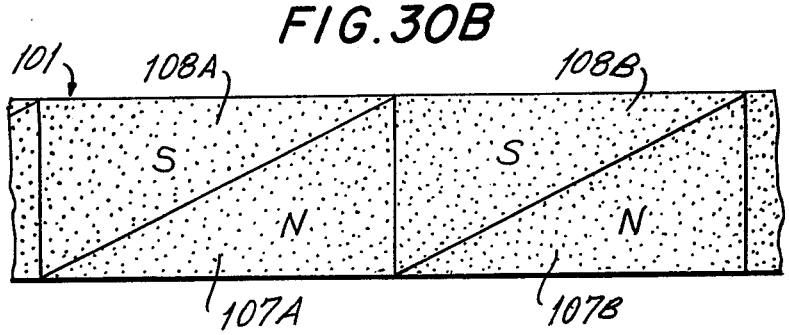

FIG. 30B shows yet another embodiment of magnetic pole pieces which can be used to generate magnetic flux distribution of a sawtooth waveform. Each pole piece is triangular with the hypotenuse of south pole piece $108_A$ overlying the hypotenuse of north pole piece $107_A$. The shorter side of triangular pole piece $107_A$ is adjacent the shorter side of triangular pole piece $108_B$, and the hypotenuse of the latter overlies the hypotenuse of triangular north pole piece $107_B$. It is appreciated that the magnetic flux which is generated by the respective triangular pole pieces is reduced from a maximum south polarity at the left-most edge of south pole piece $108_A$ to substantially zero at the boundary between south pole piece $108_A$ and north pole piece $107_A$. Then, the polarity of the magnetic flux is reversed and increases gradually until the right-most edge of north pole piece $107_A$. At that point, the magnetic flux intensity is changed from a maximum north polarity to a maximum south polarity. Then, the magnetic flux decreases in intensity to substantially zero at the boundary between south pole piece $108_B$ and north pole piece $107_B$. Thence, the magnetic flux increases with north polarity. Consequently, the generated magnetic flux has a sawtooth waveform, and the composite rotational torque which is imparted to rotor 101 has the waveform shown in FIG. 27D.

The rotor structure shown in FIGS. 25 and 27A is incorporated into a motor of the so-called radial air gap type. A similar arrangement adapted for an axial air gap type of motor is shown in FIG. 31. Thus, north pole piece $107_A$ is formed of segmental, or pie-shaped pole pieces $107_{Ax}$, $107_{Ay}$ and $107_{Az}$ formed of, for example, rare earth metal, ferrite and magnetic rubber, respectively. South pole piece 108$_A$ is formed of pie-shaped pole pieces 108$_{Ax}$, 108$_{Ay}$ and 108$_{Az}$, formed of rare earth metal, ferrite and magnetic rubber, respectively. The remaining pole pieces 107$_B$ and 108$_B$ are similarly constructed. Thus, the magnetic flux distribution in a rotary path about the axis of the motor has a sawtooth waveform.

Another embodiment of a rotor structure for an axial air gap type of motor is shown in FIG. 31B. The respective north and south pole pieces 107$_A$, 107$_B$ and 108$_A$, 108$_B$ are patterned such that the width of each pole piece changes at each angular position of a rotary path about the axis of the motor. Each pole piece is seen to be approximately comma-shaped. This structure generates a sawtooth-shaped magnetic flux distribution.

While the present invention has been particularly shown and described with reference to certain preferred embodiments, various changes and modifications in form and details can be made by one of ordinary skill in the art without departing from the spirit and scope of the invention. For example, the rotor structure of the DC motor has been described as being of the outer rotor type. It is contemplated that, if desired, the teachings of the present invention can be equally applicable to an inner rotor type of motor. As another example, the permanent magnet pole pieces may, if desired, constitute the stator structure, and the rotor assembly of the DC motor may be formed of energizable coils. In such an alternative, the DC motor may be provided with brushes. As yet another alternative, the embodiments of the axial air gap type of rotor structure shown in FIGS. 31A and 31B can be used with coils which are wound toroidally on a toroidal core, such as the coils shown in FIGS. 9–11. It is, therefore, intended that the appended claims be interpreted as including these as well as various other such changes and modifications.

What is claimed is:

1. A DC motor comprising a rotor to rotate about an axis; a stator coaxial with said rotor; at least two coils included in one of said rotor and stator and adapted to be energized for current to flow therethrough, each of said coils having a first current path portion through which current flows in a first direction and a second current path portion through which current flows in a second, opposite direction; flux generating means included in the other of said rotor and stator and having at least one pair of circumferentially disposed magnetic poles for generating magnetic flux of alternating magnetic field polarity in a rotary path about said axis, said magnetic flux linking each said coil such that, if a coil is energized over an angular region of 360 electrical degrees, a rotational torque of a predetermined direction is produced through a range having an electrical angle greater than 180°; and means for alternately energizing said coils for current to flow through each energized coil for a duration substantially equal to an electrical angle of 180° when said energized coil is within said range of said torque of said predetermined direction.

2. The motor of claim 1, further comprising a toroidal core included in said one of said rotor and stator, and wherein each of said coils is wound toroidally on said core and separated by an electrical angle of 180°; and wherein one magnetic polarity of said magnetic flux generated by said at least one pair of magnetic poles is asymmetric with respect to the other magnetic polarity thereof.

3. The motor of claim 2 wherein said toroidal core and said at least two magnetic poles are concentric about said axis, with said first current path portion of each of said coils extending in an axial direction and being radially spaced from said magnetic poles.

4. The motor of claim 2 wherein said torroidal core and said at least two magnetic poles are concentric about said axis, with said first current path portion of each of said coils extending in a radial direction and being axially spaced from said magnetic poles.

5. The motor of claim 3 or 4 wherein one of the magnetic poles in a pair has a circumferential dimension greater than an electrical angle of 180° with respect to said axis, and the other magnetic pole in said pair has a circumferential dimension less than an electrical angle of 180°.

6. The motor of claim 5 wherein said at least one pair of poles constitutes a first set and wherein said flux generating means comprises a further set of magnetic poles concentric with said at least one pair of magnetic poles, said further set including at least one set of magnetic poles in facing relation and spaced from said second current path portion of each of said coils.

7. The motor of claim 6 wherein one of the magnetic poles in a pair of said further set is of the same, magnetic polarity and is aligned with said one magnetic pole in said pair in said first set.

8. The motor of claim 5 wherein one of the poles in a pair of magnetic poles is comprised of a first magnetic path forming member and the other of the poles in said pair of magnetic poles is comprised of a second magnetic path forming member, said first and second members being in facing relation with said first current path portion of each of said coils, and said flux generating means further includes a permanent magnet in magnetic contact with said first and second members from which said magnetic flux is derived.

9. The motor of claim 5 wherein the circumferential dimension of said one magnetic pole in a pair is within the range of the electrical angle of from 220° to 280°.

10. The motor of claim 9 wherein said electrical angle is from 240° to 260°.

11. The motor of claim 5 wherein each coil is of a circumferential dimension with respect to said axis which is less than the circumferential dimension of a pole.

12. The motor of claim 1 wherein said DC motor is a brushless motor and wherein said rotor includes a rotatable shaft and said flux generating means mounted on and rotatable with said shaft; and said stator includes said at least two coils.

13. The motor of claim 1 wherein said first current path portion and said second current path portion of each coil are disposed on substantially the same cylindrical surface concentric about said axis, and wherein said first and second current path portions are separated from each other by an electrical angle less than 180°.

14. The motor of claim 13 wherein said at least one pair of magnetic poles comprises a north magnetic pole and a south magnetic pole, each having a circumferential dimension less than 180 electrical degrees.

15. The motor of claim 14, said flux generating means further comprising auxiliary magnetic poles adjacent said north and south magnetic poles, the total circumferential dimension of said north, south and auxiliary magnetic poles being equal to 360 electrical degrees.

16. The motor of claim 15 wherein said auxiliary magnetic poles comprise an auxiliary south pole piece adjacent said north magnetic pole and an auxiliary north pole piece adjacent said south magnetic pole, said auxiliary south and north pole pieces having circumferential dimensions smaller than those of said south and north magnetic poles, respectively.

17. The motor of claim 15 wherein said auxiliary magnetic poles comprise alternating south and north pole pieces adjacent said north magnetic pole and alternating north and south pole pieces adjacent said south magnetic pole, said respective alternating pole pieces having circumferential dimensions smaller than said respective south and north magnetic poles.

18. The motor of claim 14 comprising an air gap separating said north and south magnetic poles, the total circumferential dimension of said north and south magnetic poles and said air gap being equal to 360 electrical degrees, wherein the intensity of said magnetic flux linking said coils is reduced in the vicinity of said air gap.

19. The motor of claim 14 comprising a magnetic path forming member comprised of ferromagnetic material separating said north and south magnetic poles, the total circumferential dimension of said north and south magnetic poles and said magnetic path forming member being equal to 360 electrical degrees, wherein the intensity of said magnetic flux linking said coils is reduced in the vicinity of said magnetic path forming member.

20. The motor of claim 13 wherein said at least one pair of magnetic poles comprises a north magnetic pole and a south magnetic pole, each having a circumferential dimension equal to 180 electrical degrees; and said flux generating means includes intensity reducing means to reduce the intensity of said magnetic flux linking said coils in the vicinity of the change-over in polarity of said flux.

21. The motor of claim 20 wherein said intensity reducing means comprises a cut out portion formed in said north and south magnetic poles at a boundary thereof, said cut out portion having a circumferential dimension of less than 180 electrical degrees.

22. The motor of claim 20 wherein said intensity reducing means comprises a magnetic shield portion provided in said north and south magnetic poles at a boundary thereof, said shield portion having a circumferential dimension of less than 180 electrical degrees.

23. The motor of claim 20 wherein said flux generating means comprises magnetic path forming means substantially circumscribing said at least one pair of magnetic poles; and said intensity reducing means comprises a cut out portion in said magnetic path forming means at a boundary of said north and south magnetic poles, said cut out portion having a circumferential dimension of less than 180 electrical degrees.

24. The motor of claim 13 wherein said at least one pair of magnetic poles includes only a single pair of said magnetic poles.

25. The motor of claim 13, 14 or 18 wherein said at least one pair of magnetic poles includes a plurality of pairs of said magnetic poles and wherein the number of coils is equal to the number of magnetic poles, said coils being arranged symmetrically with respect to said axis.

26. The motor of claim 13 or 20 wherein said flux generating means comprises an anisotropic magnet concentric about said axis, said anisotropic magnet being formed with a plurality of pairs of magnetic poles and having the intensity of magnetization between adjacent pairs reduced with respect to the intensity of magnetization between magnetic poles in the same pair.

27. The motor of claim 13 wherein said first and second current path portions of each coil are separated from each other by the electrical angle $\theta$, where $\theta = 360° \, m + \alpha$, m being a positive integer and $\alpha$ being less than 180 electrical degrees.

28. The motor of claim 13 wherein said first and second current path portions of each coil are separated from each other by the electrical angle $\beta$, where $\beta = 360° - (360° \, m + \alpha/n)$, m being a positive integer, $\alpha$ being less than 180 electrical degrees and n being the number of pairs of magnetic poles.

29. The motor of claim 13 wherein each said magnetic pole generates a magnetic flux of progressively changing intensity, such that the generated magnetic flux of alternating magnetic field polarity appears as a sawtooth configuration in said rotary path about said axis.

30. The motor of claim 29 wherein each of said magnetic pole is formed of a plurality of magnetic elements of different material, each generating magnetic flux of progressively decreasing intensity.

31. The motor of claim 29 wherein each said magnetic pole is formed of a plurality of magnetic elements spaced from the cylindrical surface on which said coils are disposed by progressively increasing amounts.

32. The motor of claim 29 wherein each said magnetic pole is formed of a magnetic element having a surface spaced from the cylindrical surface on which said coils are disposed by a progressively increasing amount.

33. The motor of claim 29 wherein each pair of magnetic poles is comprised of a north pole piece and a south pole piece, each trapezoidally shaped when viewed in developed form.

34. The motor of claim 33, said flux generating means further comprising a triangular shaped auxiliary south pole piece adjacent said trapezoidally shaped north pole piece and a triangular shaped auxiliary north pole piece adjacent said trapezoidally shaped south pole piece, said auxiliary pole pieces also being adjacent each other.

35. The motor of claim 29 wherein each pair of magnetic poles is comprised of a triangular shaped north pole piece adjacent a triangular shaped south pole piece.

36. The motor of claim 29 wherein at least two pairs of magnetic poles are spaced axially from said coils, each pair of magnetic poles having north and south magnetized surfaces with surface areas which face said first and second current path portions that vary in a rotary path about said axis.

37. A brushless DC motor having a rotor assembly and a stator assembly arranged for relative rotation about a common axis, the stator assembly comprising a toroidal core disposed about said axis and at least two coils wound toroidally on said toroidal core, each coil having a first current path portion through which current flows in a first direction and a second current path portion through which current flows in a second, opposite direction, said first current path portion being closer to said axis than said second current path portion; and the rotor assembly comprising flux generating means including at least one pair of magnetic poles circumferentially disposed about said axis for generating magnetic flux of alternating north and south polarity in a rotary path about said axis, the magnetic flux distribution from one pole in a pair extending over an electrical angle which is larger than 180° and the magnetic flux distribution from the other pole in said pair extending over an electrical angle which is less than 180°; and further comprising means for energizing a respective coil for a duration substantially equal to 180 electrical degrees while said coil is within the magnetic flux distribution from said one pole.

38. The motor of claim 38 wherein one of said poles in a pair extends over an electrical angle of about 270° and the other pole in said pair extends over an electrical angle of about 90°; and wherein said means for energizing energizes one of said coils for a duration substantially equal to 240 electrical degrees and energizes the other of said coils for a duration substantially equal to 120 electrical degrees.

39. A brushless DC motor having a rotor assembly and a stator assembly arranged for relative rotation about a common axis, the stator assembly comprising at least two coils, each having a first current path portion in the axial direction through which current flows in a first direction and a second current path portion in the axial direction through which current flows in a second, opposite direction, both said first and second current path portions being disposed on substantially the same cylindrical surface concentric about said axis and said first and second current path portions being separated from each other by an electrical angle less than 180°; and the rotor assembly comprising flux generating means including at least one pair of magnetic poles circumferentially disposed about said axis for generating magnetic flux of uniformly alternating north and south polarity in a rotary path about said axis, and means for modifying a portion of said magnetic flux to vary the uniformity thereof over a predetermined electrical angle less than 180° when the polarity of said magnetic flux changes in one direction; and further comprising means for energizing a respective coil for a duration substantially equal to 180 electrical degrees commencing when said coil is linked with the modified portion of said flux.

40. A brushless DC motor having a rotor assembly rotatable about an axis and a stator assembly coaxial therewith, the stator assembly comprising at least two pairs of coils, the coils in a pair being connected in series and each coil having a first current path portion through which current flows in a first direction and a second current path portion through which current flows in a second, opposite direction, said first and second current path portions being separated from each other by an electrical angle less than 180° along an arc about said axis; and the rotor assembly comprising flux generating means including at least two pairs of magnetic poles circumferentially disposed about said axis for generating magnetic flux of alternating north and south polarity having an intensity of sawtooth shaped configuration extending over an electrical angle of 360°; and further comprising means for energizing a respective coil for a duration substantially equal to 180 electrical degrees commencing when said coil is linked with a predetermined portion of said sawtooth shaped flux.

* * * * *